(12) United States Patent
Al-Absi

(10) Patent No.: US 12,107,511 B2
(45) Date of Patent: *Oct. 1, 2024

(54) FIVE STAGE COMPLIMENTARY METAL-OXIDE SEMICONDUCTOR RECTIFIER WITH ENERGY HARVESTING ANTENNA

(71) Applicant: KING FAHD UNIVERSITY OF PETROLEUM AND MINERALS, Dhahran (SA)

(72) Inventor: Munir A. Al-Absi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,423

(22) Filed: Mar. 26, 2024

(65) Prior Publication Data

US 2024/0266970 A1 Aug. 8, 2024

Related U.S. Application Data

(63) Continuation of application No. 17/983,578, filed on Nov. 9, 2022, now Pat. No. 11,990,847.

(Continued)

(51) Int. Cl.
*H02M 7/219* (2006.01)
*H02J 50/00* (2016.01)
*H02J 50/20* (2016.01)

(52) U.S. Cl.
CPC .......... *H02M 7/219* (2013.01); *H02J 50/001* (2020.01); *H02J 50/20* (2016.02)

(58) Field of Classification Search
CPC ......... H02J 50/001; H02J 50/20; H02M 7/219
See application file for complete search history.

(56) References Cited

U.S. PATENT DOCUMENTS 7,768,406 B1 * 8/2010 Peach ................ H02J 50/20
340/645
7,944,279 B1 * 5/2011 El Waffaoui ....... G06K 19/0713
340/572.1

(Continued)

FOREIGN PATENT DOCUMENTS

KR 10-1725476 4/2017
KR 10-1820665 1/2018

OTHER PUBLICATIONS

Andam, et al. ; A Design of Self-biased Cross Coupled Rectifier with Integrated Dual Threshold Voltage for RF Energy Harvesting Application ; Procedia Computer Science 109C ; 2017 ; 8 Pages.

(Continued)

*Primary Examiner* — Rexford N Barnie
*Assistant Examiner* — Joseph N Inge
(74) *Attorney, Agent, or Firm* — Oblon, McClelland, Maier & Neustadt, L.L.P.

(57) ABSTRACT

A circuit and methods describing a complementary metal-oxide semiconductor (CMOS) rectifier for use in radio frequency (RF) energy harvesting with body biasing by the RF input to control the threshold voltage of each transistor. The CMOS rectifier includes an energy harvesting antenna, and multiple rectifier stages. The antenna receives electromagnetic radiation from the environment and generates a DC current. The oscillating input current is an $RF^+$ positive current during a first half cycle and is an $RF^-$ negative current during a second half cycle. A first rectifier stage includes a first capacitor connected to the $RF^+$ positive current, a second capacitor connected to the $RF^-$ negative current and a cross coupled CMOS circuit connected to the antenna.

7 Claims, 9 Drawing Sheets

Related U.S. Application Data

(60) Provisional application No. 63/390,426, filed on Jul. 19, 2022.

(56) References Cited

U.S. PATENT DOCUMENTS

| | | | |
|---|---|---|---|
| 10,312,743 | B2 | 6/2019 | Ouda |
| 10,978,917 | B2 | 4/2021 | Freitas |
| 11,515,733 | B2 * | 11/2022 | Babakhani ............... H02J 50/27 |
| 2007/0087719 | A1 * | 4/2007 | Mandal .................... H01Q 1/22 |
| | | | 455/299 |
| 2013/0062962 | A1 | 3/2013 | Xue |
| 2015/0043260 | A1 * | 2/2015 | Liu ..................... H01L 27/0814 |
| | | | 363/127 |
| 2015/0280606 | A1 * | 10/2015 | Yoshida ............. H01L 27/0629 |
| | | | 363/127 |
| 2015/0333534 | A1 * | 11/2015 | Liu ............................ H02J 5/00 |
| | | | 307/104 |
| 2018/0069486 | A1 * | 3/2018 | Ouda ...................... H02J 50/80 |
| 2021/0391804 | A1 * | 12/2021 | Salama ................... H02M 1/08 |

OTHER PUBLICATIONS

Chong, et al. ; A Wide-PCE-Dynamic-Range CMOS Cross-Coupled Differential-Drive Rectifier for Ambient RF Energy Harvesting ; IEEE Transactions on Circuits and Systems II: Express Briefs ; vol. 68, Issue 6 ; Jun. 2021 ; 3 Pages ; Abstract Only.

Kotani, et al. ; High-Efficiency Differential-Drive CMOS Rectifier for UHF RFIDs ; IEEE Journal of Solid-State Circuits, vol. 44, No. 11 ; Nov. 2009 ; 9 Pages.

Liang, et al. ; Modelling and optimization of high-efficiency differential-drive complementary metal-oxide-semiconductor rectifier for ultra-high-frequency radio-frequency energy harvesters ; IET Power Electronics, vol. 12, Issue 3 ;40 Pages.

* cited by examiner

FIVE STAGE COMPLIMENTARY METAL-OXIDE SEMICONDUCTOR RECTIFIER WITH ENERGY HARVESTING ANTENNA

CROSS REFERENCE TO RELATED APPLICATIONS

The present application is a Continuation of U.S. application Ser. No. 17/983,578, now allowed, having a filing date of Nov. 9, 2022 which claims benefit of priority to U.S. Provisional Application No. 63/390,426 having a filing date of Jul. 19, 2022.

STATEMENT OF ACKNOWLEDGEMENT

The inventors acknowledge the financial support provided by the Deanship of Research Oversight and Coordination (DROC) at The King Fahd University of Petroleum and Minerals (KFUPM), Riyadh, Saudi Arabia through Project #SB201018.

BACKGROUND

Technical Field

The present disclosure is directed to a multi-stage complementary metal-oxide-semiconductor (CMOS) rectifier for radio frequency (RF) energy harvesting

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many electrical monitoring devices, such as portable or remotely placed devices (for example, wireless sensor nodes), are powered by batteries. These batteries require recharging or replacement on a regular basis for proper functioning of the electrical devices. To reduce the usage of batteries, energy harvesting may be used. Energy harvesting involves converting energy from clean and freely available sources into electrical energy. Commonly used energy harvesting sources include sun light, heat from the environment, wind, electromagnetic radiation, kinetic energy, wave energy and vibrational energy sources. The energy can be harvested using energy harvesting devices. For example, a solar harvester may be used to convert solar energy into electrical energy. However, energy harvesting solutions such as solar harvesters and thermal harvesters are not appropriate for many types of remote electrical devices and are not usable in many geographical locations.

As electromagnetic energy is abundant in space and can be retrieved using conversion methods, electromagnetic energy harvesting devices are becoming more prevalent. Electromagnetic waves come from various sources, such as satellite stations, wireless internet, radio and television systems, telemetry, mobile communication transmission, Wi-Fi base stations, and digital multimedia broadcasting. A radio frequency (RF) power harvesting system can capture and convert electromagnetic energy into a usable direct current (DC) voltage. The RF power harvesting system includes components such as an antenna and a rectifier circuit that convert the RF power or alternating current (AC) into DC.

During the RF power harvesting process, an RF-to-DC converter supplies the direct current to the load with low ripple, high stability, large power conversion efficiency, etc. However, constraints such as reverse leakage current, threshold voltage effect, large ripple, and latch-up, impact performance of the RF-to-DC converter.

In RF harvesting systems, the rectifier circuit plays an essential role in the overall performance as the circuit is responsible for maximum power transfer from the antenna to the load. Conventional rectifiers use Schottky diodes that have a low turn-on voltage (about 200 mV) and a high saturation current.

However, integrating Schottky diodes into complementary metal oxide-semiconductor (CMOS) circuits has a high fabrication cost due to extra masks, which is not affordable in low-cost solutions. The off-chip Schottky diodes occupy more printed circuit board area, and they are not suitable for compact devices. In other conventional rectifiers, such as the Dickson charge pump rectifier, a diode-connected CMOS transistor with a zero threshold voltage $V_{th}$ is employed. However, CMOS transistors with low or zero threshold voltage $V_{th}$ fail to provide high efficiency because of their high reverse leakage current.

Some solutions have been proposed to reduce the high reverse leakage current of rectifiers. A conventional rectifier design uses bootstrapped capacitors to reduce an effective threshold voltage and a CMOS inverter to minimize the reverse leakage (See: S. R. Khan and G. S. Choi, "*High-efficiency CMOS rectifier with minimized leakage and threshold cancellation features for low power bio-implants*", IEEE, incorporated herein by reference in its entirety). Another conventional rectifier has a cross-coupled bridge configuration that is driven by a differential RF input and has PCE of 67.5% (See: K. Kotani, A. Sasaki, and T. Ito., "*High-efficiency differential-drive CMOS rectifier for UHF RFIDs*," IEEE J. Solid-State Circuits, vol. 44, no. 11, pp. 3011-3018, November 2009., incorporated herein by reference in its entirety). A conventional design of radio frequency (RF) rectifier has been proposed that adopts a dynamic self-body-biasing technique to modulate the threshold voltage of MOSFET. (See: Y. Li, Q. Li, X. Liu, X. Wang, and Y. Liu, "*A high efficiency CMOS RF rectifier for RF energy harvesting with dynamic self-body-biasing technique*," IEICE Electron. Exp., vol. 16, no. 20, pp. 1-4, September 2019, incorporated herein by reference in its entirety). A further conventional converter employs a dual-path, a series (lowpower) path and a parallel (high-power) path, to maintain high power conversion efficiency (PCE) over wide input power range. (See: D. Khan, S. J. Oh, K. Shehzad, M. Basim, D. Verma, Y. G. Pu, M. Lee, K. C. Hwang, Y. Yang, and K.-Y. Lee. (2020), "*An efficient reconfigurable RF-DC converter with wide input power range for RF energy harvesting*," IEEE Access, vol. 8, pp. 79310-79318, incorporated herein by reference in its entirety). A conventional design of RF-to-dc power converter shows an 86% PCE and −19.2-dBm (12 µW) sensitivity when operating at the medical band 433 MHz with a 100-kΩ load was described. (See: A. S. Almansouri, M. H. Ouda, and K. N. Salama, "A *CMOS RF-to-DC power converter with 86% efficiency and −19.2-dBm sensitivity*," IEEE, vol. 66, no. 5, pp. 2409-2415, May 2018., incorporated herein by reference in its entirety). A conventional design of CMOS rectifier based on an improved dynamic threshold reduction technique was described. (See: M. M. Mohamed, G. A. Fahmy, A. B. Abdel-Rahman, A. Allam, A. Barakat, M. Abo- Zahhad, H. Jia, and R. K. Pokharel, "*High-efficiency CMOS RF-to-DC rectifier based on dynamic threshold reduction technique for wireless charging applications*," IEEE Access, vol. 6, pp. 46826-46832, 2018., incorporated herein by reference in its entirety). A self-threshold voltage compensated RF-DC converter operating at 902 MHz is proposed for RF energy harvesting applications was described. (See: M. Basim, D. Khan, Q. U. Ain, K. Shehzad, M. Asif, and K. Y. Lee, "*A high efficient RF-DC converter for RF energy harvesting applications*," SoC Design Conf. (ISOCC), October 2020, pp. 37-38., incorporated herein by reference in its entirety).

These conventional CMOS rectifiers are designed to produce maximum PCE at a specific input power level and fail to harvest RF energy at a wide low input power range. The conventional rectifiers are prone to various problems such as high reverse current loss, complex circuitry, and requires extra components. Hence, there is a need for a CMOS rectifier for RF energy harvesting that is configured to employ a body biasing scheme for reducing reverse leakage current and is able to provide high PCE at both low and high input power levels.

SUMMARY

In an exemplary embodiment, a complementary metal-oxide semiconductor (CMOS) rectifier for use in radio frequency (RF) energy harvesting is described. The CMOS rectifier includes an energy harvesting antenna and a first rectifier stage. The energy harvesting antenna is configured to receive an electromagnetic radiation and generate an oscillating current, wherein the oscillating current is an $RF^+$ positive current during a first half cycle and is an $RF^-$ negative current during a second half cycle. The first rectifier stage includes a first energy harvesting capacitor $C_1$ connected to the $RF^+$ positive current; a second energy harvesting capacitor $C_2$ connected to the $RF^-$ negative current; a cross coupled CMOS circuit connected to the antenna.

The cross coupled CMOS circuit includes a first output capacitor $C_{s1}$ having a first stage voltage output terminal, wherein a second terminal of $C_{s1}$ is connected to a ground; a first P-channel metal oxide semiconductor (PMOS) transistor MP1 connected at its drain to the first energy harvesting capacitor $C_1$, at its source to the first stage voltage output terminal and at its gate to the second energy harvesting capacitor $C_2$; a first N-channel metal oxide semiconductor (NMOS) transistor MN1 connected at its drain to the first harvesting capacitor $C_1$, at its source to a ground terminal and at its gate to the second energy harvesting capacitor $C_2$; a second PMOS transistor MP2 connected at its drain to the second energy harvesting capacitor $C_2$, at its source to the first stage voltage output terminal and at its gate to the first energy harvesting capacitor $C_1$; a second NMOS MN2 connected at its drain to the second harvesting capacitor $C_2$, at its source to the ground and at its gate to the first harvesting capacitor $C_1$; a first body biasing capacitor $C_{b1}$ connected between the $RF^-$ negative current and a body contact of the first NMOS transistor MN1; a second body biasing capacitor $C_{b2}$ connected between the $RF^-$ negative current and a body contact of the first PMOS transistor MP1; a third body biasing capacitor $C_{b3}$ connected between the $RF^+$ positive current and a body contact of the second NMOS transistor MN2; and a fourth body biasing capacitor $C_{b4}$ connected between the $RF^+$ positive current and a body contact of the second PMOS transistor MP2.

In another exemplary embodiment, a five-stage complementary metal-oxide semiconductor (CMOS) rectifier for use in radio frequency (RF) energy harvesting is described. The CMOS includes a plurality of rectifier stages, an input of the input rectifier stage, an input of a first intermediate rectifier stage, an input of a second intermediate rectifier stage, an input of a third intermediate rectifier stage, an input of the output rectifier stage, a third capacitor $C_3$, a fourth capacitor $C_4$, a fifth capacitor $C_5$, and a sixth capacitor $C_6$. The plurality of rectifier stages includes an input rectifier stage, three intermediate rectifier stages and an output rectifier stage, wherein each rectifier stage of the plurality rectifier stages is connected to an energy harvesting antenna configured to receive an electromagnetic radiation and generate an oscillating current, wherein the oscillating current is an $RF^+$ positive current during a first half cycle and is an $RF^-$ negative current during a second half cycle, wherein each rectifier stage includes an input and an output. The input of the input rectifier stage is connected to a ground and an output of the input rectifier stage is connected to an input stage output capacitor $C_{s1}$, wherein input stage output capacitor $C_{s1}$ has a first stage voltage output terminal and is connected to the ground, wherein the input rectifier stage is connected to the $RF^+$ current by a first energy harvesting capacitor $C_1$ and to the $RF^-$ current by a second energy harvesting capacitor $C_2$. The input of a first intermediate rectifier stage is connected to the first stage voltage output terminal and an output of the first intermediate rectifier stage is connected to a first intermediate stage output capacitor $C_{s2}$, wherein the first intermediate output capacitor $C_{s2}$ has a first intermediate stage voltage output terminal and is connected to the first stage voltage output terminal, and wherein the first intermediate rectifier stage is connected to the $RF^+$ current by a third energy harvesting capacitor $C_3$ and to the $RF^-$ current by a fourth energy harvesting capacitor $C_4$. The input of a second intermediate rectifier stage is connected to the first intermediate stage voltage output terminal and an output of the second intermediate rectifier stage is connected to a second intermediate stage output capacitor $C_3$, wherein the second intermediate stage output capacitor $C_3$ has a second intermediate stage voltage output terminal and is connected to first intermediate stage voltage output terminal, and wherein the second intermediate rectifier stage is connected to the $RF^+$ current by a fifth energy harvesting capacitor $C_5$ and to the $RF^-$ current by a sixth energy harvesting capacitor $C_6$. The input of a third intermediate rectifier stage is connected to the second intermediate stage voltage output terminal and an output of the third intermediate rectifier stage is connected to a third intermediate stage output capacitor $C_{s4}$, wherein the third intermediate stage output capacitor $C_{s4}$ has a third intermediate stage voltage output terminal and is connected to the second intermediate stage voltage output terminal, and wherein the third intermediate rectifier stage is connected to the $RF^+$ current by a seventh energy harvesting capacitor $C_7$ and to the $RF^-$ current by an eighth energy harvesting capacitor $C_8$. The input of the output rectifier stage is connected to the third intermediate stage voltage output terminal and an output of the output rectifier stage is connected to an output stage capacitor $C_{sout}$, wherein the output stage capacitor $C_{sout}$ has an output stage voltage output terminal and is connected to the third intermediate stage voltage output terminal, and wherein the output rectifier stage is connected to the $RF^+$ current by a ninth energy harvesting capacitor $C_9$ and to the $RF^-$ current by an tenth energy harvesting capacitor $C_{10}$. The third capacitor $C_3$ connected between the $RF^-$ negative current and a body contact of the first NMOS transistor. The fourth capacitor $C_4$ connected between the $RF^-$ negative current and a body contact of the first PMOS transistor. The fifth capacitor $C_5$ connected between the $RF^+$ positive current and a body contact of the second PMOS transistor. The sixth capacitor $C_6$ connected between the $RF^+$ positive current and a body contact of the second NMOS transistor. Each rectifier stage includes a cross coupled CMOS circuit connected to the antenna, wherein the cross coupled CMOS circuit includes a first P-channel metal oxide semiconductor (PMOS) transistor connected at its drain to an $RF^+$ voltage, at its source to the output, at its gate to an $RF^-$ voltage, and at its body contact to a body biasing capacitor connected to the $RF^-$ current; a first N-channel metal oxide semiconductor (NMOS) transistor connected at its drain to an $RF^+$ voltage, at its source to the input, at its gate to an $RF^-$ voltage, and at its body contact to a body biasing capacitor connected to the $RF^-$ current; a second PMOS transistor connected at its drain to the $RF^-$ voltage, at its source to the output, at its gate to an $RF^+$ voltage and at its body contact to a body biasing capacitor connected to the $RF^+$ current; and a second NMOS transistor connected at its drain to the $RF^-$ voltage, at its source to the input, at its gate to the $RF^+$ voltage, and at its body contact to a body biasing capacitor connected to the $RF^+$ current.

In another exemplary embodiment, a method for harvesting radio frequency (RF) energy is described. The method includes receiving, by an energy harvesting antenna, an electromagnetic radiation. The method further includes generating, by the energy harvesting antenna, an oscillating current, wherein the oscillating current is an $RF^+$ positive current during a first half cycle and is an $RF^-$ negative current during a second half cycle. The method further includes connecting a first energy harvesting capacitor $C_1$ to the $RF^+$ positive current. The method further includes connecting a second energy harvesting capacitor $C_2$ to the $RF^-$ negative current. The method further includes connecting a cross coupled CMOS circuit to the first energy harvesting capacitor $C_1$ and the second energy harvesting capacitor $C_2$, wherein connecting the cross coupled CMOS circuit includes: connecting the first stage voltage output terminal to a first output capacitor $C_{s1}$ having and connecting a second terminal of $C_{s1}$ to a ground; connecting a first P-channel metal oxide semiconductor (PMOS) transistor MP1 at its drain to the first energy harvesting capacitor $C_1$, at its source to the first stage voltage output terminal and at its gate to the second energy harvesting capacitor $C_2$; connecting a first N-channel metal oxide semiconductor (NMOS) transistor MN1 at its drain to the first energy harvesting capacitor $C_1$, at its source to a ground terminal and at its gate to the second energy harvesting capacitor $C_2$; connecting a second PMOS transistor MP2 at its drain to the second energy harvesting capacitor $C_2$, at its source to the first stage voltage output terminal and at its gate to the first energy harvesting capacitor $C_1$; connecting a second NMOS transistor MN2 connected at its drain to the second energy harvesting capacitor $C_2$, at its source to the ground and at its gate to the first energy harvesting capacitor $C_1$; connecting a first body biasing capacitor $C_{b1}$ between the $RF^-$ negative current and a body contact of the first NMOS transistor MN1; connecting a second body biasing capacitor $C_{b2}$ between the $RF^-$ negative current and a body contact of the first PMOS transistor MP1; connecting a third body biasing capacitor $C_{b3}$ between the $RF^+$ positive current and a body contact of the second NMOS transistor MN2; and connecting a fourth body biasing capacitor $C_{b4}$ between the $RF^+$ positive current and a body contact of the second PMOS transistor MP2.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
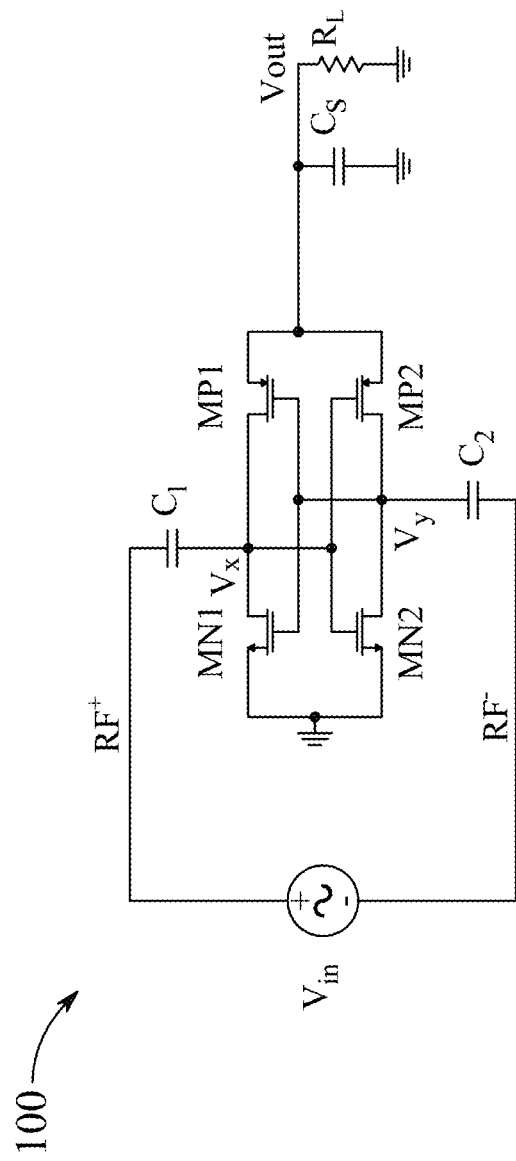
FIG. 1 illustrates a block diagram of a cross-coupled rectifier.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a complementary metal-oxide semiconductor (CMOS) rectifier for use in radio frequency (RF) energy harvesting. The present CMOS rectifier includes a modified cross-coupled architecture. The CMOS rectifier employs an adaptive body biasing technique to lower the transistor threshold voltage ($V_{th}$) when a P-channel metal-oxide-semiconductor (PMOS) is ON. The modified cross-coupled architecture is configured to increase the conduction current. The modified cross-coupled architecture increases $V_{th}$ when the PMOS is OFF, thereby minimizing the current flowing in a reverse bias condition. The CMOS rectifier was simulated using a TSMC 0.18 μm CMOS technology (also known as CMOSP18) under various loading conditions at an input frequency of 953 MHz. The CMOS rectifier showed a peak power conversion efficiency (PCE) of 78.2% at an input power of −27.5 dBm and a 100 kΩ load.

A radio frequency (RF) energy harvester harvests RF energy from the environment. The RF energy harvester employs a wireless power transfer technique in which the received RF signals are converted into electricity. The RF energy harvester is implemented in various applications including, wireless sensor networks, wearable electrical devices, wireless charging, and IoT devices. The RF energy harvester includes, inter alia an antenna, an impedance matching circuit, a plurality of voltage multipliers (rectifier circuits), and an energy storage unit. The RF energy harvester converts RF energy to DC energy, thus it is also referred to as a RF to DC converter.

In an operative aspect, the RF waves present in the environment are captured by an antenna. The antenna converts the captured RF waves (electromagnetic waves) into AC electrical signals. An impedance matching circuit ensures that maximum power is delivered from the antenna to a rectifier circuit (voltage multiplier circuit). The matching circuit is made of capacitor and inductor components. The rectifier circuit converts the AC electrical signals received from the antenna into DC power. After passing through the impedance matching circuit, the rectifier circuit (voltage multiplier circuit) rectifies and amplifies the signal as per the needs of the load. In an aspect, the rectifier circuit may be a voltage multiplier (a special rectifier) circuit which rectifies the signal and also boosts the rectified signal based on the application requirement. The converted DC electricity is stored in the energy storage unit. The energy storage unit uses a capacitor or battery to store the electricity and supplies the stored DC electricity to the load whenever needed.

The antenna is employed as a first stage of the RF energy harvester to capture RF waves. The antenna is coupled to the impedance matching network to match the impedance of the antenna to that of the rectifier circuit to achieve maximum power transfer. The rectifier circuit converts the incoming AC signal into DC signal, which is delivered to the energy storage unit to store the obtained DC energy. The rectifier circuit plays a crucial role in overall performance of the RF energy harvester. Therefore, an improvement in the rectifier circuit would lead to a better RF energy harvesting. In an aspect, a figure of merit in the RF rectifier circuit is the power conversion efficiency (PCE). The PCE is defined as a ratio of power absorbed by the load to the total input power, expressed as:

$$PCE = \frac{\text{output power}}{|\text{input power}|} = \frac{V_{out} \times I_{out}}{|V_{AC}| \times I_{in}} \times 100. \tag{1}$$

FIG. 1 illustrates a block diagram of a conventional cross-coupled rectifier 100. The conventional cross-coupled rectifier 100 includes a first P-channel metal oxide semiconductor (PMOS) transistor MP1, a first N-channel metal oxide semiconductor (NMOS) transistor MN1, a first N-channel metal oxide semiconductor (NMOS) transistor MN1, a second PMOS transistor MP2, and a second NMOS transistor MN2.

In an aspect of the present disclosure, the conventional cross-coupled rectifier 100 is coupled to an antenna. The antenna is configured to receive an electromagnetic radiation from the environment or a RF generating source. The antenna is configured to generate an oscillating current. The oscillating current is an RF⁺ positive current during a first half cycle and is an RF⁻ negative current during a second half cycle.

In an operative aspect, during the positive half cycle (RF⁺ positive current), the transistors MP1 and the MN2 are conducting, and their corresponding threshold voltages ($V_{th}$) are reduced by applying an input voltage differentially. At the same time, MP2 and MN1 are reversely biased to reduce their leakage current, and vice versa in the negative half cycle. The conventional cross-coupled rectifier 100 suffers from leakage of reverse current through the conducting PMOS (either MP1 or MP2) during the operating cycle, when $V_x < V_{out}$. A detailed analysis and modeling of the conventional cross-coupled rectifier 100 has been carried out and verified using simulation.

In an aspect, the models of the conventional cross-coupled rectifier 100 are derived under the assumption that all transistors have the same absolute value of $V_{th}$. Moreover, it is considered that all transistors are designed such that they all have the same conduction current. The intermediate voltages $V_x$ and $V_y$ are given by:

$$V_x = \frac{C1}{2(C1 + C_{eq})} V_p \cos(wt) + 0.5 V_{out}. \tag{2}$$

$$V_y = -\frac{C2}{2(C2 + C_{eq})} V_p \cos(wt) + 0.5 V_{out}. \tag{3}$$

where $V_p$ is the peak voltage of the differential RF input, $V_{in}$, $C_1$ and $C_2$ are DC coupling capacitors, $C_{eq}$ is an equivalent capacitor seen by $V_x$ and $V_y$, and $V_{out}$ is an output DC voltage. In an aspect, the conventional cross-coupled rectifier 100 works in two regimes depending on the difference between $V_x$ and $V_y$, which is the gate to source voltage across each transistor. When $V_x - V_y < V_{th}$ and $V_x > V_{out}$, MP1 transistor operates in weak inversion in which the conduction current is given by:

$$I_{D,sub} = I_{s0} e^{\frac{V_{GS} - V_{th} - V_{off}}{nV_t}} \left(1 - e^{-\frac{V_{DS}}{V_t}}\right), \tag{4}$$

where $$I_{s0} = \mu_0 \frac{W}{L} \sqrt{\frac{q\varepsilon_{si} N_{ch}}{2\varphi_s}} V_t^2. \tag{5}$$

with $V_{off}$ as an offset voltage and n as a swing parameter, both of which are for sub-threshold operation. $V_t$ is the thermal voltage, $\mu_0$ is the electron mobility, q is electron charge, $\varepsilon_{si}$ is the silicon primitivity, $N_{ch}$ is the doping concertation in the channel, and $\varphi_s$ is the surface potential. When $V_{out} > V_x$, a reverse current given by (4) flows from a storage element to source.

On the other hand, when $V_x - V_y > V_{th}$ and $V_x > V_{out1}$, MP1 transistor is in the inversion state, in which the conduction current is given as:

$$I_{D,tri} = \mu_0 C_{ox} \frac{W}{L}((V_{GS} - V_{th})V_{DS} - 0.5V_{DS}^2). \tag{6}$$

This inversion continues until $V_{out}$r becomes greater than $V_x$, in which case a reverse current given by (6) will flow. When $V_x$ drops even further, MP1 enters into a saturation region and the reverse current takes the following form:

$$I_{D,sat} = \frac{1}{2}\mu_0 C_{ox} \frac{W}{L}(V_{GS} - V_{th})^2. \tag{7}$$

Figure 2:
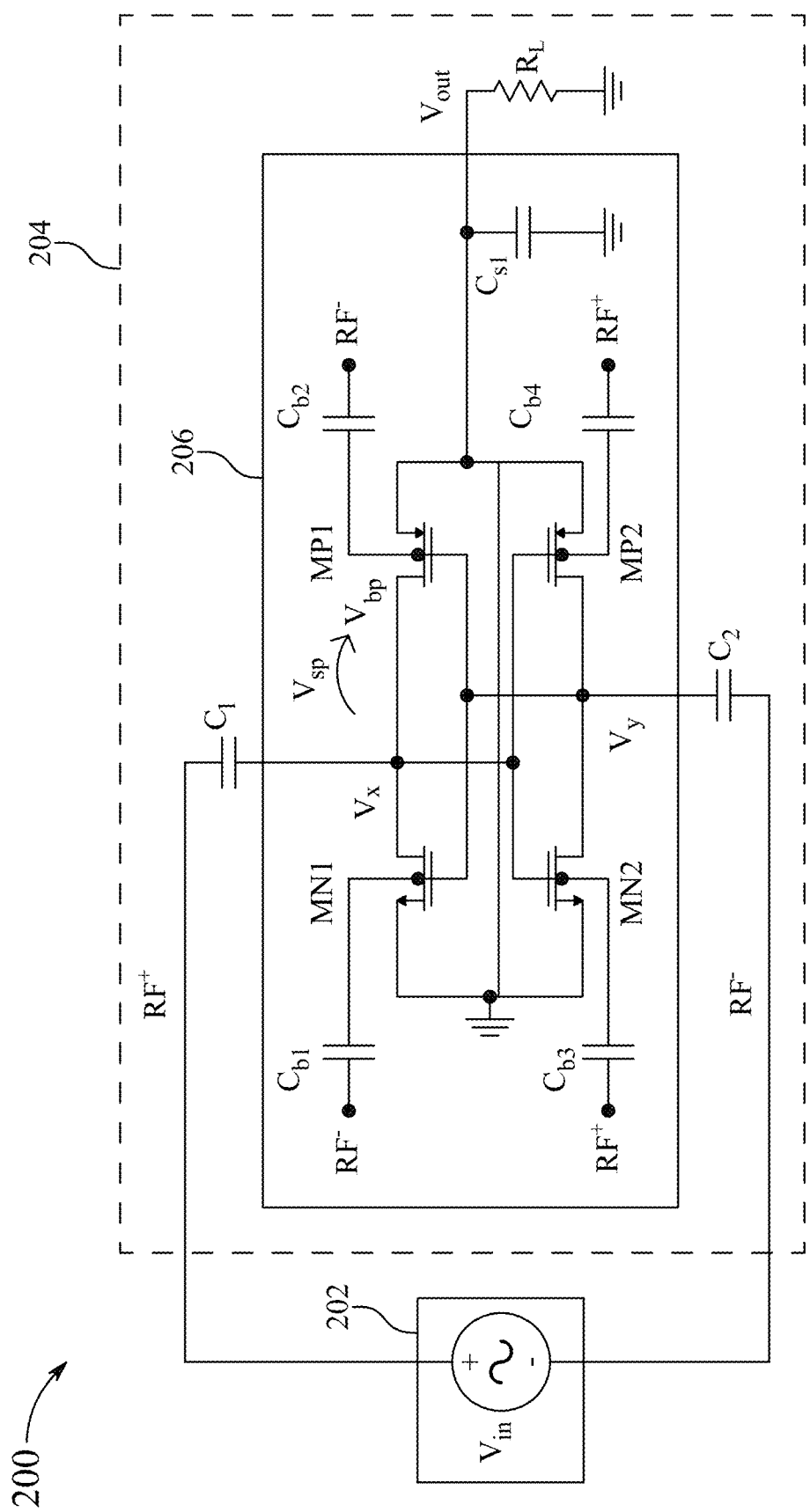
FIG. 2 illustrates a block diagram of a complementary metal-oxide semiconductor (CMOS) rectifier, according to aspects of the present disclosure.

FIG. 2 illustrates a block diagram of a complementary metal-oxide semiconductor (CMOS) rectifier for use in radio frequency (RF) energy harvesting (hereinafter referred to as "CMOS rectifier 200"), according to an aspect of the present disclosure.

Referring to FIG. 2, the CMOS rectifier 200 includes various components such as an energy harvesting antenna 202 and a first rectifier stage 204. In an aspect, the CMOS 200 is configured to include a plurality of rectifier stages as per application and requirement. In an aspect, the CMOS rectifier 200 is configured to receive electromagnetic radiation from the environment or from an RF source. For example, the RF source includes radio signals, cellular signals, global system for mobile (GSM) signals, or digital or analog television signals. In some examples, the CMOS rectifier 200 harvests RF power from a single RF source, such as an RFID interrogator, at a single frequency. In an example, the CMOS rectifier 200 harvests RF power from multiple RF sources at multiple frequencies.

The energy harvesting antenna 202 is configured to receive an electromagnetic radiation from the environment or the RF source and generate an oscillating current. In an aspect, the electromagnetic radiation acts as a differential input signal $V_{in}$. The oscillating current is an $RF^+$ positive current during a first half cycle. The oscillating current is an $RF^-$ negative current during a second half cycle. In an aspect, the energy harvesting antenna 202 is coupled to a receiver. For example, the receiver may include an antenna wire, a tuning coil of copper wire, a rectifier, and other components. In an aspect, the energy harvesting antenna 202 may include various types of antennas and various electrical components, such as capacitors, resistors, inductors, and diodes. In some examples, the energy harvesting antenna 202 may be a conventional crystal radio antenna. In an aspect, the energy harvesting antenna 202 includes a copper wire coil, a silver wire coil, or a ferrite coil. In an example, the energy harvesting antenna 202 may be a Yagi, log-periodic, fiberglass, cable, repeater, or other type of antennas, including those used in the existing knowledge. The energy harvesting antenna 202 may be manufactured from a printed circuit board, aluminum, copper, silver, other metals, or other materials. The energy harvesting antenna 202 may omni-directional antenna that collects the available electromagnetic (radio) signals. The shape, size, circumference, and composition of the energy harvesting antenna 202 may be altered for a specific application and/or to enhance the gain associated with the antenna.

In an aspect of the present disclosure, the CMOS rectifier 200 includes an impedance matching circuit. The impedance matching circuit is configured to be tuned to capture certain frequencies from the RF source. In order to achieve maximal power output, an impedance of the energy harvesting antenna 202 needs to be matched with an output impedance of the first rectifier stage 204. The impedance matching circuit include capacitive and inductive circuitry configured to provide maximum power transfer from the RF energy source. The rectifier component may be used to convert alternating current generated from the RF signal to direct current.

As shown in FIG. 2, in a circuitry aspect, the first rectifier stage 204 includes a first energy harvesting capacitor $C_1$, a second energy harvesting capacitor $C_2$, and a cross coupled CMOS circuit 206. The first rectifier stage 204 includes the energy harvesting antenna 202 and receives a differential RF input from the energy harvesting antenna 202. The first energy harvesting capacitor $C_1$ is connected to the energy harvesting antenna 202 and receives the $RF^+$ positive current during the first half cycle. The second energy harvesting capacitor $C_2$ is connected to the energy harvesting antenna 202 and receives the $RF^-$ negative current during the second half cycle. The cross coupled CMOS circuit 206 is also connected to the energy harvesting antenna 202 and receives the $RF^+$ positive current and the $RF^-$ negative current from the energy harvesting antenna 202.

As shown in FIG. 2, the cross coupled CMOS circuit 206 includes a first output capacitor $C_{s1}$, a first P-channel metal oxide semiconductor (PMOS) transistor MP1, a first N-channel metal oxide semiconductor (NMOS) transistor MN1, a second PMOS transistor MP2, a second NMOS MN2, a first body biasing capacitor $C_{b1}$, a second body biasing capacitor $C_{b2}$, a third body biasing capacitor $C_{b3}$, and a fourth body biasing capacitor $C_4$.

The first output capacitor $C_{s1}$ has a first stage voltage output terminal. A second terminal of $C_{s1}$ is connected to the ground. The first PMOS transistor MP1 is connected to the first energy harvesting capacitor $C_1$ at a drain terminal. The first PMOS transistor MP1 is connected to the first stage voltage output terminal at a source terminal. The first PMOS transistor MP1 is connected to the second energy harvesting capacitor $C_2$ at a gate terminal.

The first NMOS transistor MN1 is connected to the first harvesting capacitor $C_1$ at a drain terminal. The first NMOS transistor MN1 is connected to a ground terminal at a source terminal. The first NMOS transistor MN1 is connected to the second energy harvesting capacitor $C_2$ at a gate terminal.

The second PMOS transistor MP2 is connected to the second energy harvesting capacitor $C_2$ at a drain terminal. The second PMOS transistor MP2 is connected to the first stage voltage output terminal at a source terminal. The second PMOS transistor MP2 is connected to the first energy harvesting capacitor $C_1$ at a gate terminal.

The second NMOS transistor MN2 is connected to the second harvesting capacitor $C_2$ at a drain terminal. The second NMOS transistor MN2 is connected to the ground at a source terminal. The second NMOS transistor MN2 is connected to the first harvesting capacitor $C_1$ at a gate terminal.

In an operating aspect, the first PMOS transistor MP1 and the second NMOS transistor MN2 are configured to operate in an ON state during the first half cycle and in an OFF state during the second half cycle. In an operating aspect, the second PMOS transistor MP2 and the first NMOS transistor MN1 are configured to operate in an OFF state during the first half cycle and in an ON state during the second half cycle.

The first body biasing capacitor $C_{b1}$ is connected between the RF⁻ negative current and a body contact of the first NMOS transistor MN1. The second body biasing capacitor $C_{b2}$ is connected between the RF⁻ negative current and a body contact of the first PMOS transistor MP1. The third body biasing capacitor $C_{b3}$ is connected between the RF⁺ positive current and a body contact of the second NMOS transistor MN2. The fourth body biasing capacitor $C_{b4}$ connected between the RF⁺ positive current and a body contact of the second PMOS transistor MP2.

In an aspect, the CMOS rectifier 200 includes a load ($R_L$) that is connected in parallel with the first output capacitor $C_{s1}$. The cross coupled CMOS circuit 206 is configured to convert the oscillating current generated by the energy harvesting antenna to a DC voltage at the first output capacitor $C_{s1}$ and provide the DC voltage to the load ($R_L$).

In an aspect, a threshold voltage of the first NMOS transistor MN1 is configured to increase during the first half cycle of the oscillating current and decrease during the second half cycle due to the charging and discharging respectively, of the body biasing first capacitor $C_{b1}$ which biases the body contact of the first NMOS transistor MN1.

In an aspect, a threshold voltage of the first PMOS transistor MP1 is configured to decrease during the first half cycle of the oscillating current and increase during the second half cycle due to the charging and discharging respectively, of the body biasing second capacitor $C_{b2}$ which biases the body contact of the first PMOS transistor MP1.

In an aspect, a threshold voltage of the second NMOS transistor MN2 is configured to decrease during the first half cycle of the oscillating current and increase during the second half cycle due to the charging and discharging respectively, of the body biasing third capacitor $C_{b3}$, which biases the body contact of the second NMOS transistor MN2.

In an aspect, a threshold voltage of the second PMOS transistor MP2 is configured to increase during the first half cycle of the oscillating current and decrease during the second half cycle due to the charging and discharging respectively, of the body biasing fourth capacitor $C_{b4}$ which biases the body contact of the second PMOS transistor MP2.

The present disclosure presents a CMOS RF-DC converter based on the threshold voltage self-compensation. To improve the PCE of the CMOS rectifier 200, the following relation between $V_{th}$ and the body voltage ($V_b$) of the transistor can be used:

$$V_{th}=V_{th0}+\gamma(\sqrt{|2\varphi_F+V_{sb}|}-\sqrt{|2\varphi_F|}), \quad (8)$$

where $V_{th0}$, $\varphi_F$, and $\gamma$ are process dependent parameters, and $V_{sb}$ denotes a potential difference between the source terminal and body terminal of a MOSFET. From equation (8), it can be seen that variation in $V_b$ results in either an increase or a decrease in $V_{th}$, depending on whether a PMOS or an NMOS is used. This characteristic of the MOSFET device can be utilized to obtain an improved rectifier for RF energy harvesting applications. In order to vary the body voltage of the NMOS, the NMOS is required to be fabricated in a deep n-well structure.

The present disclosure is configured to improve a cross-coupled design of the rectifier by employing an adaptive body biasing. When $V_x$ is positive, corresponding to the ON state of MP1, and $V_{bp}$ is negative, then a differential voltage between the source and body terminal of MP1, $V_{sb}=V_x-V_{bp}$, is positive and relatively high. The positive and high differential voltage results in a lower $V_{th}$ for MP1 as suggested by equation (8), since for a PMOS $V_{th0}$, $\gamma$, $\varphi_F<0$. The common mode voltage is cancelled since $V_{sb}$ is a differential mode signal.

On the other hand, when $V_x$ is negative, which represents an OFF state of MP1, $V_{bp}$ is positive, resulting in a high negative value for $V_{sb}$. This high negative value of $V_{sb}$ results in a higher $V_{th}$, which reduces the current flowing in the reverse bias condition.

For the second NMOS transistor MN2, when $V_x$ is negative, and $V_{bp}$ is positive, the differential voltage between the source terminal and body terminal of MN2, $V_{sb}=V_x-V_{bp}$, is generated. The generated differential voltage results in a lower $V_{th}$ for MN2. On the other hand, when $V_x$ is positive, which represents an OFF state of MN2, $V_{bp}$ is positive, resulting in a high negative value for $V_{sb}$. This high negative value of $V_{sb}$ results in a higher $V_{th}$, which reduces the current flowing in the reverse bias condition.

In an operating aspect, for MP2, when $V_x$ is negative, corresponding to the ON state of MP2, and $V_{bp}$ is negative, a differential voltage between the source terminal and body terminal of MP2, $V_{sb}=V_x-V_{bp}$, is generated. The differential voltage is positive and relatively high resulting in a lower $V_{th}$ for MP2 as suggested by equation (8).

On the other hand, when $V_x$ is negative, which represents an OFF state of MP2, $V_{bp}$ is positive, resulting in a high negative value for $V_{sb}$. This high negative value of $V_{sb}$ results in a higher $V_{th}$, which reduces the current flowing in the reverse bias condition.

On the other hand, for the first NMOS transistor MN1, when $V_x$ is negative, and $V_{bp}$ is positive, then the differential voltage between the source terminal and body terminal of MN2, $V_{sb}=V_x-V_{bp}$, generated. The generated differential voltage results in a lower $V_{th}$ for MN2. On the other hand, when $V_x$ is positive, which represents an OFF state of MN1, $V_{bp}$ is positive, resulting in a high negative value for $V_{sb}$. This high negative value of $V_{sb}$ results in a higher $V_{th}$, which reduces the current flowing in the reverse bias condition.

To analyze mathematically, equation (8) can be rewritten as:

$$V_{th,b}=V_{th0}+\gamma(\sqrt{|2\varphi_F+V_s-V_b|}-\sqrt{|2\varphi_F|}), \quad (9)$$

where $V_s$ is the source voltage and $V_b$ is the body voltage of the transistor. Thus, in the modified analysis, each $V_{th}$ should be replaced by $V_{th,b}$. In the positive half cycle, when $V_{RF^+}>0$, $V_{RF^-}<0$, $V_x=V_y<V_{th,b}$, and $V_x>V_{out}$, MP1 operates in the weak inversion, and as a consequence of body biasing, the new conduction current through MP1 is given by:

$$I_{D,sub,b}=I_{s0}e^{\frac{V_{GS}-V_{th,b}-V_{of}}{nV_t}}\left(1-e^{-\frac{V_{DS}}{V_t}}\right), \quad (10)$$

where $$V_{th,b}=V_{th0}+\gamma(\sqrt{|2\varphi_F+V_s-V_{bp}|}-\sqrt{|2\varphi_F|}) \quad (11)$$

As $V_{bp}<0$, the term $V_s-V_{bp}$ is higher than the case of the conventional cross-coupled structure when the voltage $V_b=V_{out}$. As a result, a lower $V_{th}$ is achieved.

From equation (10), it can be seen that $V_{th}$ reduction results in a higher conduction current.

In the other case, when $V_x-V_y>V_{th,b}$, and $V_x>V_{out}$, MP1 operates in the strong inversion, with a new conduction current given as:

$$I_{D,tri,b} = \mu_0 C_{ox} \frac{W}{L} \left( (V_{GS} - V_{th,b}) V_{DS} - 0.5 V_{DS}^2 \right), \quad (12)$$

where $V_{th,b}$ still has the form of equation (11) but with $V_{bp}$ having a greater negative (absolute value) value, resulting in an even lower $V_{th,b}$. When $V_{out}$ becomes greater than $V_x$, a reverse current flows as a result of body biasing. The reverse current will be given by:

$$I_{D,tri,b,r} = \mu_0 C_{ox} \frac{W}{L} \left( (V_{GS} - V_{th,b}) V_{DS} - 0.5 V_{DS}^2 \right), \quad (13)$$

where $V_{th,b}$ will have the same form as equation (11).

As $V_x$ becomes lower, $V_{bp}$ changes and becomes less negative. Therefore, $V_{th,b}$ would be higher in the reverse mode. Subsequently, when $V_x$ drops even further, MP1 enters into a saturation region with a reverse current given by:

$$I_{D,sat,b,r} = \frac{1}{2} \mu_0 C_{ox} \frac{W}{L} (V_{GS} - V_{th,b})^2 \quad (14)$$

Nevertheless, $V_{bp}$ will continue to increase, resulting in higher $V_{th,b}$. A similar operation takes place in the negative half cycle when $V_{RF^+} < 0$, $V_{RF^-} > 0$, and MP2 starts conducting.

When MP1 is conducting, the output voltage is given by:

$$V_{out} = V_x - V_{thp1}, \quad (15)$$

where $V_{thp1}$ is the threshold voltage of MP1. Lowering the $V_{thp1}$ results in increasing the output voltage as shown below:

$$V_{out} = V_x - (V_{th0} + \gamma(\sqrt{|2\varphi_F + V_x - V_{bp}|} - \sqrt{|2\varphi_F|})) \quad (16)$$

Figure 3:
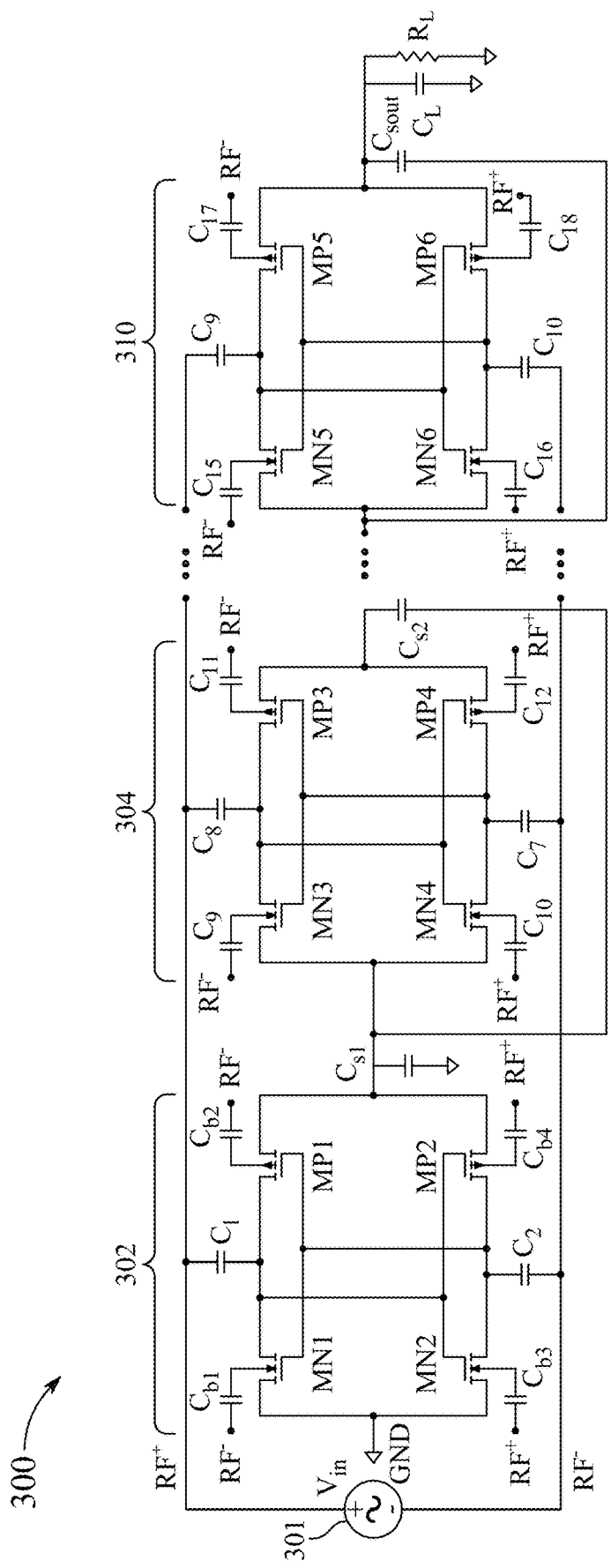
FIG. 3 illustrates a circuit diagram showing a configuration of a five-stage CMOS rectifier, according to aspects of the present disclosure.

FIG. 3 illustrates a circuit diagram showing a configuration of a five-stage CMOS rectifier 300 for use in radio frequency (RF) energy harvesting (hereinafter referred to as "CMOS rectifier 300"), according to one or more aspects of the present disclosure. The five-stage CMOS rectifier 300 is configured to convert the oscillating current generated by the energy harvesting antenna to the DC voltage and provide the DC voltage to the load.

Referring to FIG. 3, the CMOS rectifier 300 includes an energy harvesting antenna ($V_{in}$) 301 and a plurality of rectifier stages (302, 304, 310). The plurality of rectifier stages (302, 304, 310) includes an input rectifier stage 302, three intermediate rectifier stages 304 and an output rectifier stage 310. Each rectifier stage of the plurality rectifier stages (302, 304, 310) is connected to the energy harvesting antenna 301. In an aspect, the electromagnetic radiation is fed in parallel to each of the stages. Each stage is configured to receive the oscillating current from the energy harvesting antenna 301 and generate the DC voltage. The DC voltage produced by each stage is summed in series to produce the output DC Voltage, which is supplied to the load.

As shown in FIG. 3, each rectifier stage (302, 304, 310) includes an input and an output. The input of the input rectifier stage 302 is connected to ground, and an output of the input rectifier stage 302 is connected to an input stage output capacitor $C_{s1}$. The input stage output capacitor $C_{s1}$ has a first stage voltage output terminal and is connected to the ground. The input rectifier stage 302 is connected to the RF$^+$ current by a first energy harvesting capacitor $C_1$, and to the RF$^-$ current by a second energy harvesting capacitor $C_2$.

In a connecting aspect, an input of a first intermediate rectifier stage 304 is connected to the first stage voltage output terminal. An output of the first intermediate rectifier stage is connected to a first intermediate stage output capacitor $C_{s2}$. The first intermediate output capacitor $C_{s2}$ has a first intermediate stage voltage output terminal and is connected to the first stage voltage output terminal. The first intermediate rectifier stage 304 is connected to the RF$^+$ current by a third energy harvesting capacitor $C_3$, and to the RF$^-$ current by a fourth energy harvesting capacitor $C_4$.

Figure 4:
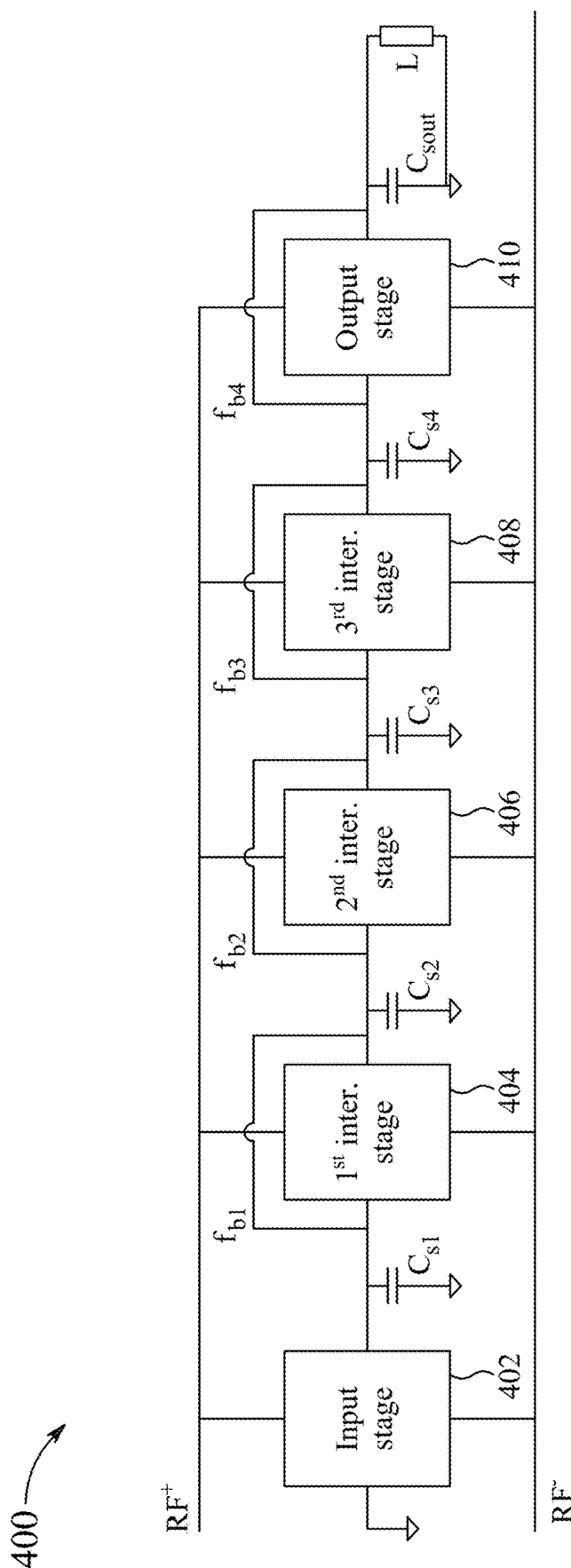
FIG. 4 represents an exemplary block diagram of the five-stage CMOS rectifier, according to aspects of the present disclosure.

Referring to both FIG. 3 and FIG. 4, in a connecting aspect, an input of a second intermediate rectifier stage is connected to the first intermediate stage voltage output terminal. An output of the second intermediate rectifier stage is connected to a second intermediate stage output capacitor $C_3$. The second intermediate stage output capacitor $C_3$ has a second intermediate stage voltage output terminal and is connected to the first intermediate stage voltage output terminal. The second intermediate rectifier stage is connected to the RF$^+$ current by a fifth energy harvesting capacitor $C_5$ and to the RF$^-$ current by a sixth energy harvesting capacitor $C_6$.

In a connecting aspect, an input of a third intermediate rectifier stage is connected to the second intermediate stage voltage output terminal. An output of the third intermediate rectifier stage is connected to a third intermediate stage output capacitor $C_{s4}$. The third intermediate stage output capacitor $C_{s4}$ has a third intermediate stage voltage output terminal and is connected to the second intermediate stage voltage output terminal. The third intermediate rectifier stage is connected to the RF$^+$ current by a seventh energy harvesting capacitor $C_7$ and to the RF$^-$ current by an eighth energy harvesting capacitor $C_8$.

In a connecting aspect, an input of the output rectifier stage 310 is connected to the third intermediate stage voltage output terminal. An output of the output rectifier stage 310 is connected to an output stage capacitor $C_{sout}$. The output stage capacitor $C_{sout}$ has an output stage voltage output terminal and is connected to the third intermediate stage voltage output terminal. The output rectifier stage 310 is connected to the RF$^+$ current by a ninth energy harvesting capacitor $C_9$ and to the RF$^-$ current by a tenth energy harvesting capacitor $C_{10}$. The output rectifier stage 310 includes a load connected in parallel with the capacitor $C_{sout}$.

Each rectifier stage includes a cross coupled CMOS circuit that is connected to the energy harvesting antenna 301. For example, the input rectifier stage 302 has a first cross coupled CMOS circuit. The first cross coupled CMOS circuit includes a first P-channel metal oxide semiconductor (PMOS) transistor MP1, a first N-channel metal oxide semiconductor (NMOS) transistor MN1, a second PMOS transistor MP2, and a second NMOS transistor MN2.

The first PMOS transistor MP1 is connected to an RF$^+$ voltage at a drain terminal. The first PMOS transistor MP1 is connected to the output, at a source terminal. The first PMOS transistor MP1 is connected to an RF$^-$ voltage at a gate terminal. The first PMOS transistor MP1 is connected to a body biasing capacitor connected to the RF$^-$ current at body contact. In an aspect, a fourth capacitor $C_4$ is connected between the RF$^-$ negative current and a body contact of the first PMOS transistor MP1.

The first NMOS transistor MN1 is connected to an RF$^+$ voltage at a drain terminal. The first NMOS transistor MN1 is connected to the input at a source terminal. The first NMOS transistor MN1 is connected to an RF$^-$ voltage at a gate terminal. The first NMOS transistor MN1 is connected to a body biasing capacitor connected to the RF$^-$ current at body contact. In an aspect, a third capacitor $C_3$ is connected between the $RF^-$ negative current and a body contact of the first NMOS transistor MN1.

The second PMOS transistor MP2 is connected to the $RF^-$ voltage at a drain terminal. The second PMOS transistor MP2 is connected to the output at a source terminal The second PMOS transistor MP2 is connected to an $RF^+$ voltage at a gate terminal. The second PMOS transistor MP2 is connected to a body biasing capacitor connected to the $RF^+$ current at body contact. In an aspect, a fifth capacitor $C_5$ is connected between the $RF^+$ positive current and a body contact of the second PMOS transistor MP2.

The second NMOS transistor MN2 is connected to the $RF^-$ voltage at a drain terminal. The second NMOS transistor MN2 is connected to the input at a source terminal. The second NMOS transistor MN2 is connected to the $RF^+$ voltage at a gate terminal. The second NMOS transistor MN2 is connected to a body biasing capacitor connected to the $RF^+$ current at a body contact. In an aspect, a sixth capacitor $C_6$ is connected between the $RF^+$ positive current and a body contact of the second NMOS transistor MN2.

The first PMOS transistor MP1 and the second NMOS transistor MN2 are configured to operate in an ON state during the first half cycle and in an OFF state during the second half cycle. The second PMOS transistor MP2 and the first NMOS transistor MN1 are configured to operate in an OFF state during the first half cycle and in an ON state during the second half cycle.

In an aspect, the first intermediate rectifier stage 304 includes a second cross coupled CMOS circuit. An input of a second cross coupled CMOS circuit is connected to a third linking capacitor $C_{13}$ and a fourth linking capacitor $C_{14}$. The second cross coupled CMOS circuit includes a second output capacitor $C_{s2}$, a first PMOS transistor MP3, a first NMOS transistor MN3, a second PMOS transistor MP4, a seventh capacitor $C_7$, an eight capacitor $C_8$, a fifth capacitor $C_5$, and a sixth capacitor $C_6$.

The second output capacitor $C_{s2}$ includes a second stage voltage output terminal which is connected to the ground. The first PMOS transistor MP3 is connected to the first capacitor $C_1$ at a drain terminal. The first PMOS transistor MP3 is connected to the second stage voltage output terminal at a source terminal. The first PMOS transistor MP3 is connected to the second capacitor $C_2$ at a gate terminal.

The first NMOS transistor MN3 is connected to the first capacitor $C_1$ at a drain terminal. The first NMOS transistor MN3 is connected to the input at a source terminal. The first NMOS transistor MN3 is connected to the second capacitor $C_2$ at a gate terminal.

The second PMOS transistor MP4 is connected to the second capacitor $C_2$ at a drain terminal. The second PMOS transistor MP4 is connected to the second stage voltage output terminal at a source terminal. The second PMOS transistor MP4 is connected to the first capacitor $C_1$ at a gate terminal.

The second NMOS transistor MN4 is connected to the second capacitor $C_2$ at a drain terminal. The second NMOS transistor MN4 is connected to the input at a source terminal. The second NMOS transistor MN4 is connected to the first capacitor $C_1$ at a gate terminal.

The seventh capacitor $C_7$ is connected between the $RF^-$ negative current and a body contact of the first NMOS transistor MN3. The eight capacitor $C_8$ is connected between the RF negative current and a body contact of the first PMOS transistor MP3. The fifth capacitor $C_5$ is connected between the $RF^+$ positive current and a body contact of the second PMOS transistor MP2. The sixth capacitor $C_6$ is connected between the $RF^+$ positive current and a body contact of the second NMOS transistor MN2.

In an aspect, each stage of the five-stage CMOS rectifier 300 is connected to a load ($R_L$) connected in parallel with the output capacitor $C_{sout}$ and a load capacitor $C_L$. For example, the first stage includes the load connected in parallel with the output capacitor $C_{s1}$. The first intermediate includes the load connected in parallel with the output capacitor $C_{s2}$. The second intermediate stage includes the load connected in parallel with the output capacitor $C_{s3}$. The third intermediate stage includes the load connected in parallel with the output capacitor $C_{s4}$.

In an aspect, a threshold voltage of each first NMOS transistor MN1 is configured to increase during the first half cycle of the oscillating current and decrease during the second half cycle due to the charging and discharging charging, respectively, of the body biasing capacitor which biases the body contact of each first NMOS transistor MN1.

In an aspect, a threshold voltage of each first PMOS transistor MP1 is configured to decrease during the first half cycle of the oscillating current and increase during the second half cycle due to the charging and discharging, respectively, of the body biasing capacitor which biases the body contact of the first PMOS transistor MP1.

In an aspect, a threshold voltage of each second PMOS transistor MP2 is configured to increase during the first half cycle of the oscillating current and decrease during the second half cycle due to the charging and discharging, respectively, of the body biasing capacitor which biases the body contact of each second PMOS transistor MP1.

In an aspect, a threshold voltage of each second NMOS transistor MN2 is configured to decrease during the first half cycle of the oscillating current and increase during the second half cycle due to the charging and discharging, respectively, of the body biasing capacitor which biases the body contact of each second NMOS transistor MN1.

FIG. 4 represents an exemplary block diagram of the five-stage CMOS rectifier 400 (hereinafter referred to as "CMOS rectifier 400"), according to one or more aspects of the present disclosure. The construction of CMOS rectifiers 300 and 400 are substantially similar as described in FIG. 3 and FIG. 4, and thus the construction is not repeated here in detail for the sake of brevity.

Referring to FIG. 4, the CMOS rectifier 400 includes an energy harvesting antenna (not shown) and a plurality of rectifier stages (402, 404, 406, 408, 410). The plurality of rectifier stages (402, 404, 406, 408, 410) includes an input rectifier stage 402, three intermediate rectifier stages (404, 406, 408), and an output rectifier stage 410. Each rectifier stage of the plurality rectifier stages (402, 404, 406, 408, 410) is connected to the energy harvesting antenna. Each stage (402, 404, 406, 408, 410) is configured to receive the oscillating current from the energy harvesting antenna and generate a DC voltage.

As shown in FIG. 4, each rectifier stage (402, 404, 406, 408, 410) includes an input and an output. An input of the input rectifier stage 402 is connected to the ground, and an output of the input rectifier stage 402 is connected to an input stage output capacitor $C_{s1}$. An input of a first intermediate rectifier stage 404 is connected to the first stage voltage output terminal, and an output of the first intermediate rectifier stage 404 is connected to an input stage output capacitor $C_{s2}$. An input of the second intermediate rectifier stage 406 is connected to the first intermediate stage voltage output terminal, and an output of the second intermediate rectifier stage 406 is connected to an input stage output capacitor $C_{s3}$. An input of the third intermediate rectifier stage 408 is connected to the second intermediate stage voltage output terminal, and an output of the third intermediate rectifier stage 408 is connected to an input stage output capacitor $C_{s4}$. An input of the output rectifier stage is connected to the third intermediate stage voltage output terminal, and an output of the output rectifier stage is connected to an output stage capacitor $C_{sout}$. In an aspect, the voltage output terminal of the input rectifier stage 402 may be connected to the input of the second intermediate rectifier stage 406 via the $f_{b1}$. Similarly, the voltage output terminal of the first rectifier intermediate stage 404 may be connected to the input of the third intermediate rectifier stage 406 via the $f_{b2}$. In an aspect, the voltage output terminal of the second rectifier intermediate stage 406 may be connected to the input of the output rectifier stage 410 via the $f_{b3}$. Similarly, the voltage output terminal of the third rectifier intermediate stage 404 may be connected to the output stage capacitor $C_{sout}$ via the $f_{b4}$.

The following examples are provided to illustrate further and to facilitate the understanding of the present disclosure.

In an aspect, the functionality of the present CMOS rectifier 200 was verified using Tanner T-spice in a 0.18 μm Taiwan Semiconductor Manufacturing Company (TSMC) CMOS technology. In an example, each of MP1 and MP2 has a width/length (W/L) equal to 18 μm/0.18 μm. In another example, MN1 and MN2 have the W/L equal to 10 μm/0.18 μm. The value of the threshold voltage used in the simulation was 516.84 mV for NMOS, and −511.69 mV for PMOS. The smoothing capacitor ($Cs_{out}$) had a value of 300 pF, and all other capacitors had a value of 1.13 pF. For the purpose of comparison, the CMOS rectifier 200 was simulated with the values and parameters as used in conventional rectifiers.

Figure 5:
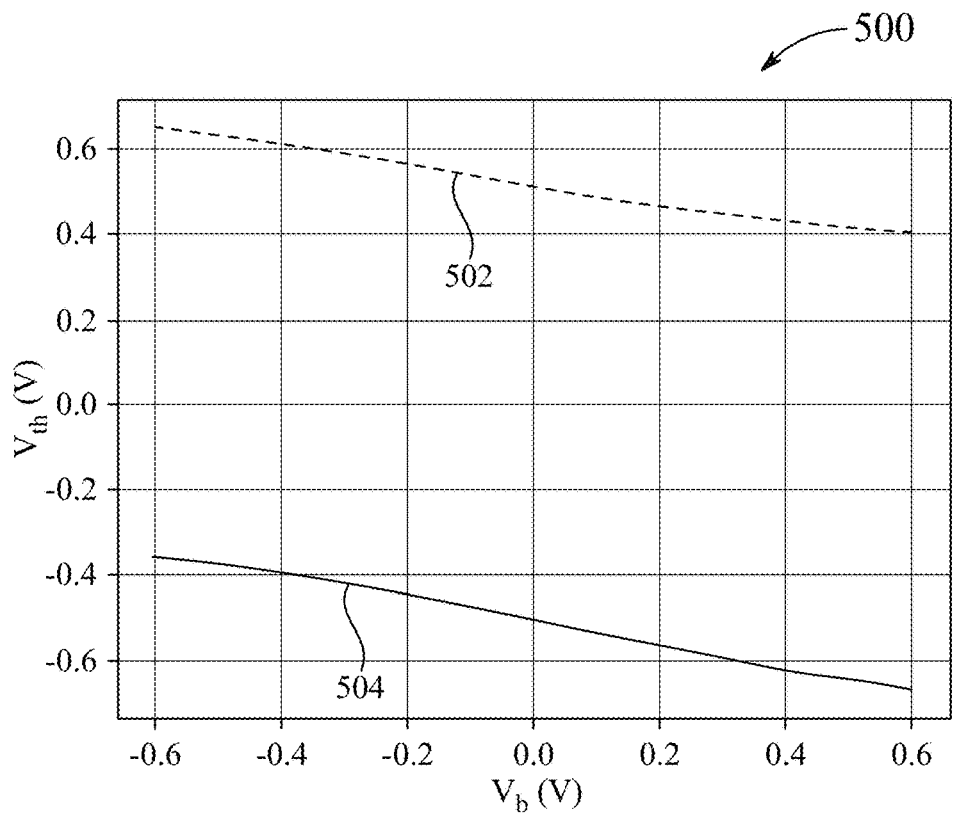
FIG. 5 is an exemplary graph illustrating variation in threshold voltage with body voltage, according to aspects of the present disclosure.

FIG. 5 is an exemplary graph 500 showing the variation in threshold voltage $V_{th}$ with body voltage $V_b$. Curve 502 represents the variation in the threshold voltage with body voltage of the PMOS having W/L=18 u/0.18 u. Curve 504 represents the variation in the threshold voltage with the body voltage of the NMOS having W/L=10 u/0.18 u. From FIG. 5, it can be seen that variation in $V_b$ resulted in either an increase or a decrease in $V_{th}$ depending on whether the PMOS or the NMOS is used.

Figure 6:
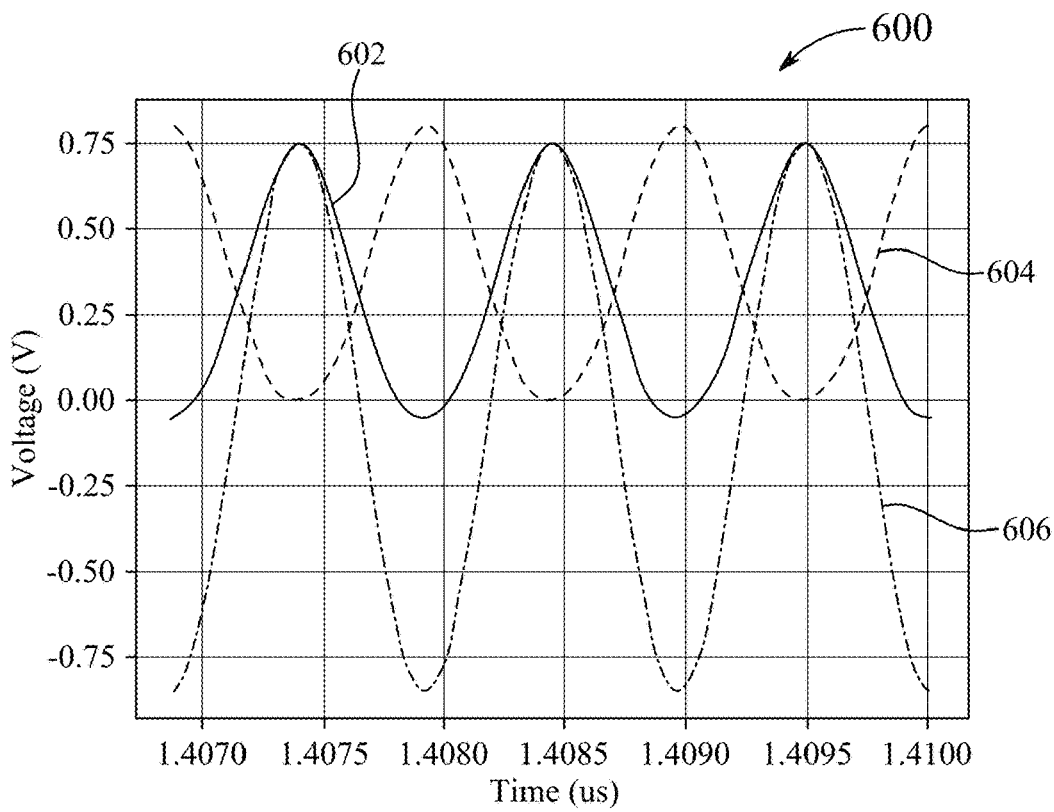
FIG. 6 is an exemplary graph illustrating voltage versus time across MP1 of the source voltage, the body voltage, and the difference between the source voltage and the body voltage at an input voltage=0.8 V, according to aspects of the present disclosure.

FIG. 6 is an exemplary graph 600 showing various waveforms across MP1 having a source voltage ($V_x$), a body voltage ($V_{bp}$), and a voltage difference ($V_{sb}$) at input voltage=0.8 V, according to aspects of the present disclosure. Curve 602 represents the variation in the source voltage ($V_x$). Curve 604 represents the variation in the body voltage ($V_{bp}$). Curve 606 represents the voltage difference ($V_{sb}$) between the source voltage ($V_x$) and the body voltage ($V_{bp}$). As shown in FIG. 6, when $V_x$ is positive, MP1 is in an ON state. When $V_{bp}$ is negative, then the differential voltage between the source and body terminals of MP1, $V_{sb}=V_x-V_{bp}$, will be positive and relatively high. This results in a lower $V_{th}$ for MP1 as suggested by equation (8), since for the PMOS $V_{th0,\gamma}, \varphi_F < 0$.

Figure 7:
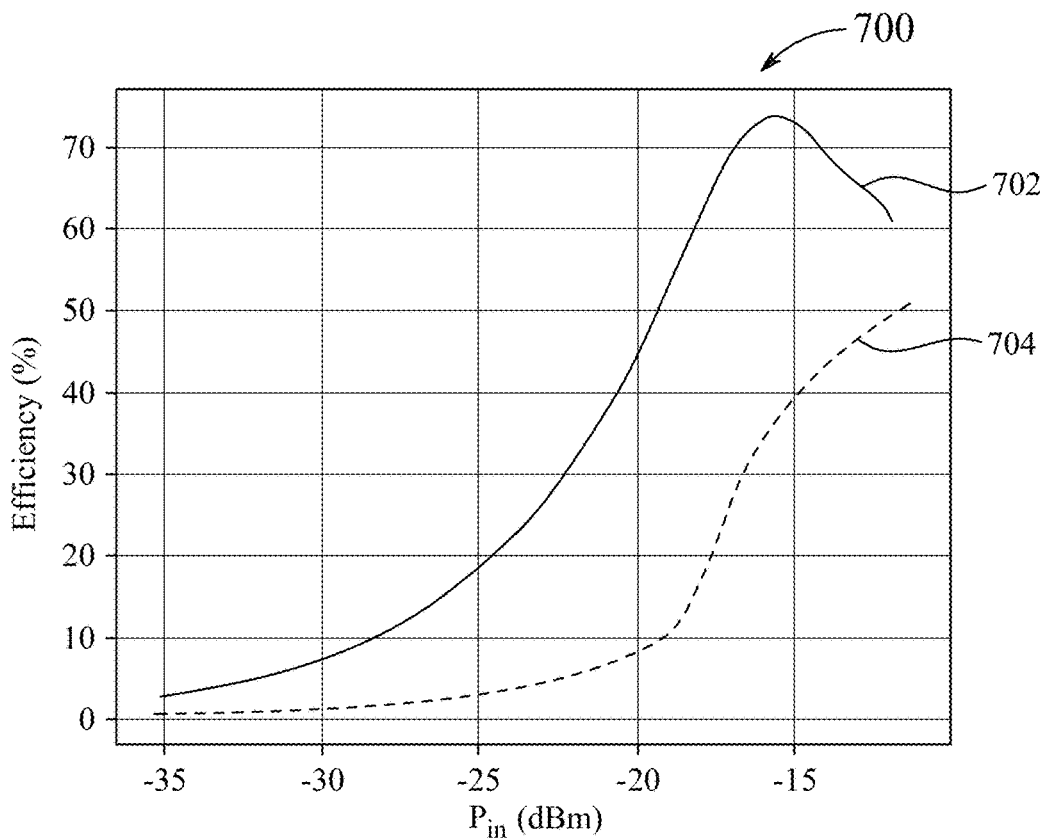
FIG. 7 is an exemplary graph illustrating power conversion efficiency (PCE) versus an input power at $R_L$=10 k$\Omega$ at 953 MHz, according to aspects of the present disclosure.

FIG. 7 is an exemplary graph 700 showing the relationship of a power conversion efficiency (PCE) versus input power ($P_{in}$) at $R_L$=10 kΩ at 953 MHz. Curve 702 represents the PCE of the present CMOS rectifier 200. Curve 704 represents the PCE of the conventional cross coupled rectifier 100.

Figure 8:
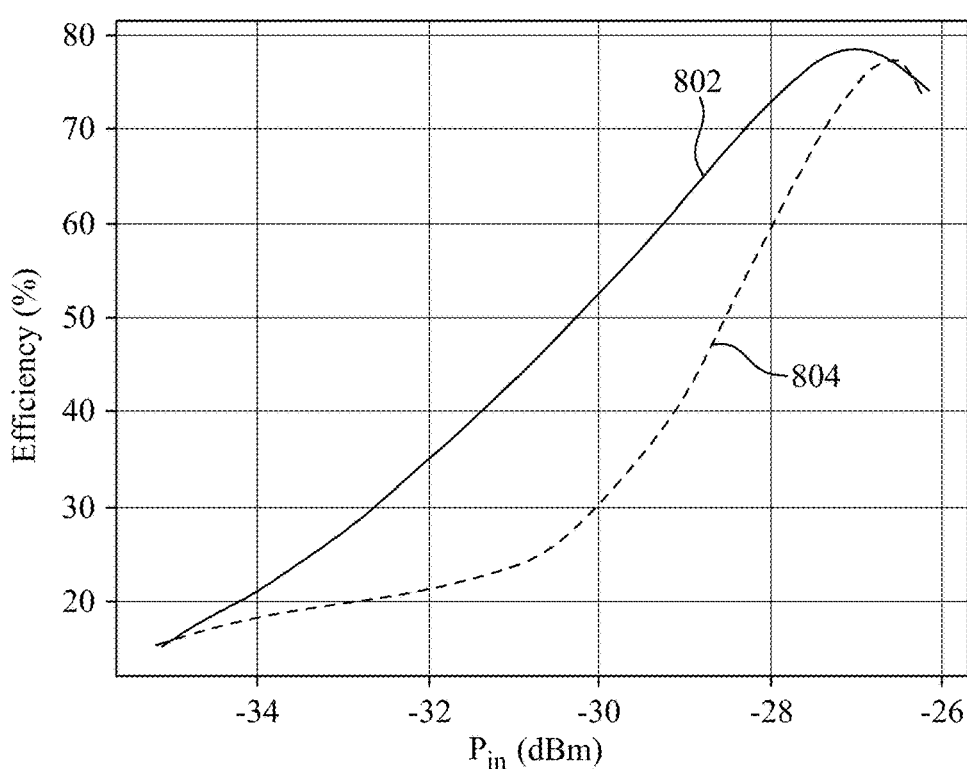
FIG. 8 is an exemplary graph illustrating the PCE efficiency versus the input power at $R_L$=100 k$\Omega$ at 953 MHz, according to aspects of the present disclosure.

FIG. 8 is an exemplary graph 800 showing a relationship of the PCE versus the input power ($P_{in}$) at $R_L$=100 kΩ at 953 MHz. Curve 802 represents PCE of the CMOS rectifier 200. Curve 804 represents PCE of the conventional cross coupled rectifier 100.

FIG. 7 and FIG. 8 demonstrate the performance of the CMOS rectifier 200 for different loads at 953 MHz. It can be seen from FIG. 7 and FIG. 8 that the CMOS rectifier 200 outperforms the conventional cross-coupled structure at low input levels. Inspection of FIG. 7 and FIG. 8 show that the CMOS rectifier 200 reaches to its peak first, and then the CMOS rectifier 200 follows a downward trend in efficiency.

The CMOS rectifier 200 achieves high PCE at low input power levels. Therefore, it can be used with one or more other designs that are more efficient at higher input power levels but perform poorly at low input power levels. Complementing each other results in a design that achieves high PCE at both low and high input power levels.

Figure 9:
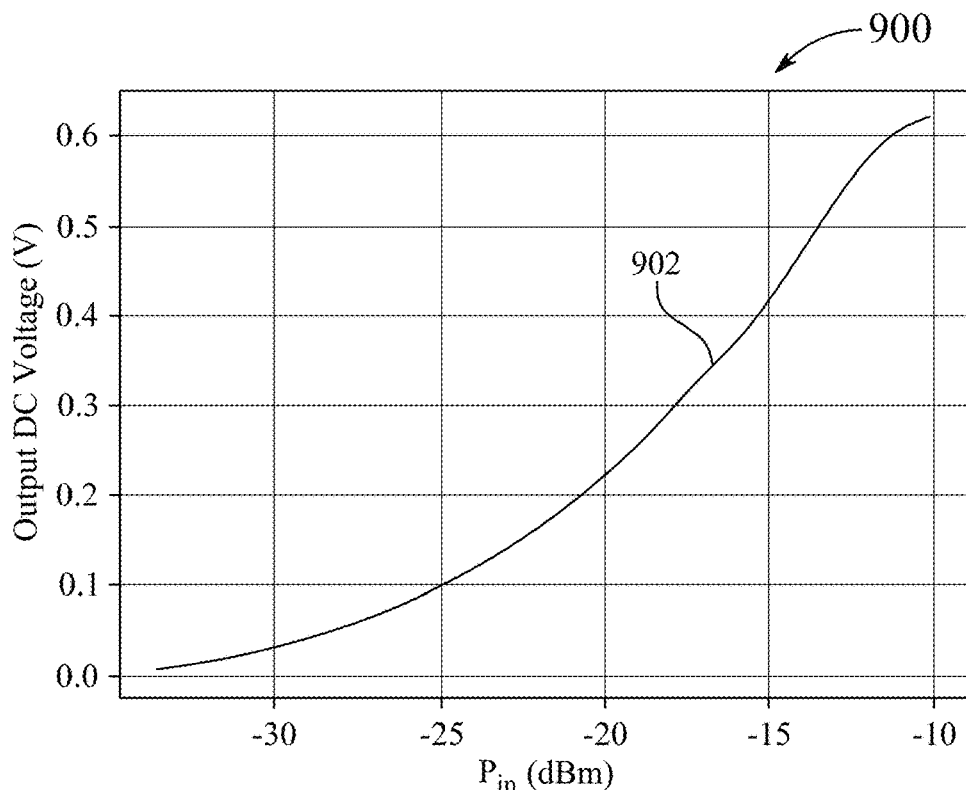
FIG. 9 is an exemplary graph illustrating the DC output voltage versus the input power, according to aspects of the present disclosure.

FIG. 9 is an exemplary graph 900 showing variation in DC output voltage versus the input power, according to aspects of the present disclosure. Curve 902 represents variation in DC output voltage of the CMOS rectifier 200. As shown in FIG. 9, the output DC voltage as a function of the input power ($P_{in}$) for $R_L$=10 kΩ. To meet the high voltage requirement of microcontrollers, a multistage configuration is required. To examine whether the cross coupled CMOS circuit is capable of producing a high DC output voltage, a five-stage rectifier 300 using the cross coupled CMOS circuit shown in FIG. 2, was simulated under the conditions of 0.8V peak input voltage, a frequency of 953 MHz and 100 kΩ load.

Figure 10:
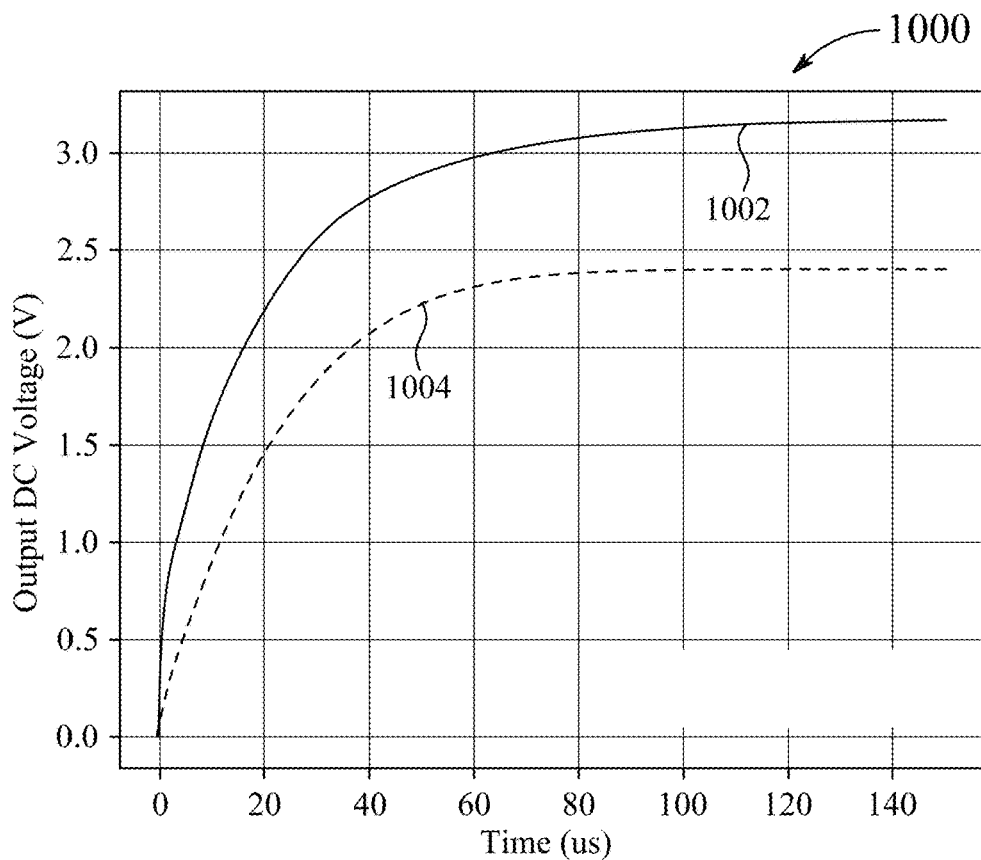
FIG. 10 is an exemplary graph illustrating a DC output voltage waveform of the CMOS rectifier versus time, according to aspects of the present disclosure.

FIG. 10 is an exemplary graph 1000 showing the DC output voltage waveform. The DC output voltage for five stages is shown in FIG. 10. It can be seen that the output of the CMOS rectifier 300 achieved a better steady state value of 3.2V. Curve 1002 represents variation in DC output voltage of the CMOS rectifier 200. Curve 1004 represents DC output voltage of the conventional cross coupled rectifier 100.

Figure 11:
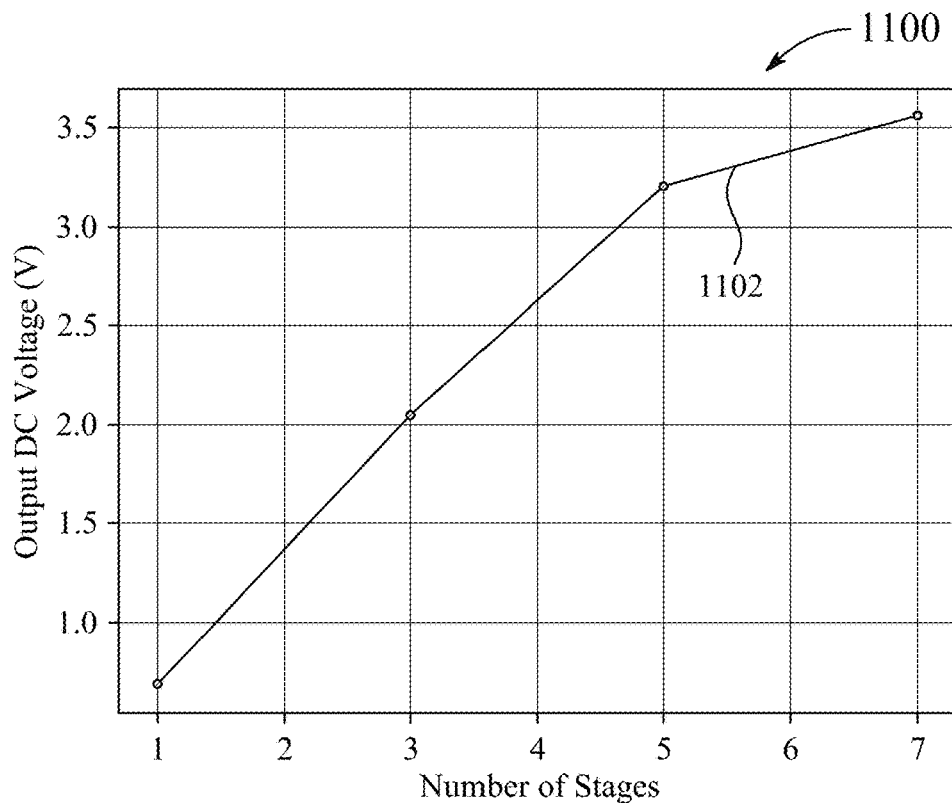
FIG. 11 is an exemplary graph illustrating a variation in DC output voltage versus the number of stages of the CMOS rectifier at $R_L$=100 k$\Omega$, according to aspects of the present disclosure.

FIG. 11 is an exemplary graph 1100 illustrating a variation in DC output voltage versus the number of stages at $R_L$=100 kΩ, according to aspects of the present disclosure. Curve 1102 represents variation in DC output voltage of the CMOS rectifier 300. The DC output voltage as a function of the number of stages is shown in FIG. 11. It can be seen that beyond the five stages, the improvement ceased to be significant.

Figure 12:
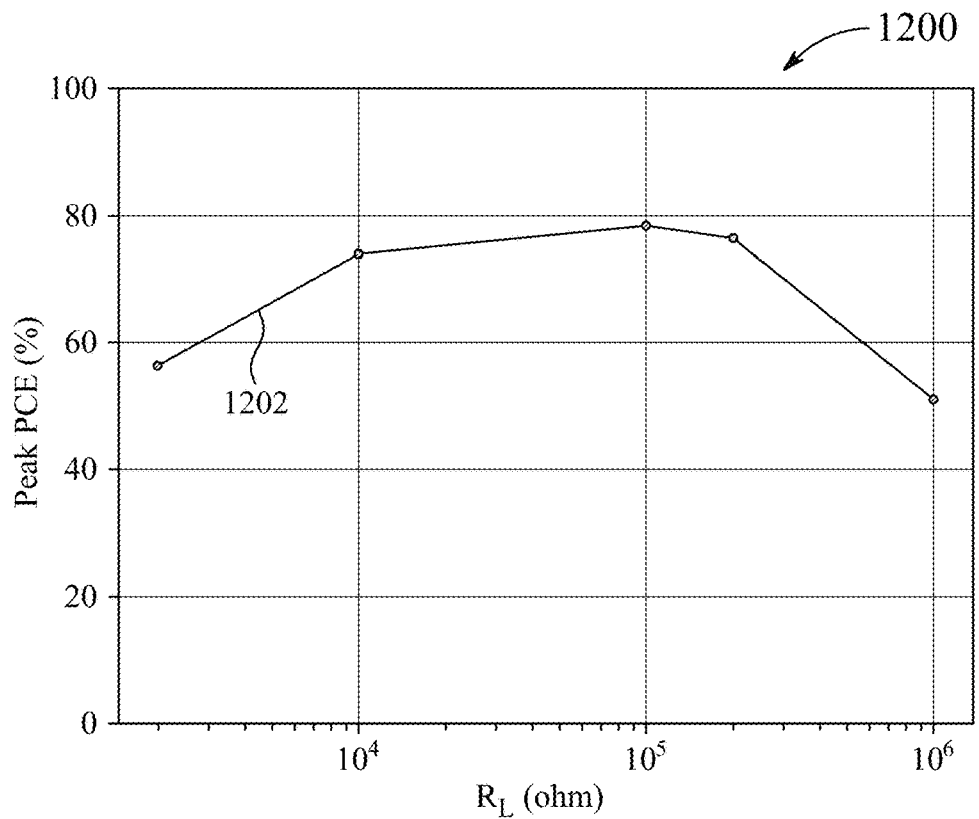
FIG. 12 is an exemplary graph illustrating an effect of load variation on peak PCE of the CMOS rectifier, according to aspects of the present disclosure.

FIG. 12 is an exemplary graph 1200 illustrating an effect of load variation on peak PCE, according to aspects of the present disclosure. Curve 1202 represents PCE of the CMOS rectifier 200 corresponding to the load variation. To see the effects of the load variation on the efficiency, the simulation was carried out for different loads. The simulation result shown in FIG. 12 indicates that the efficiency is highest in the vicinity of a 100 kΩ load.

Figure 13:
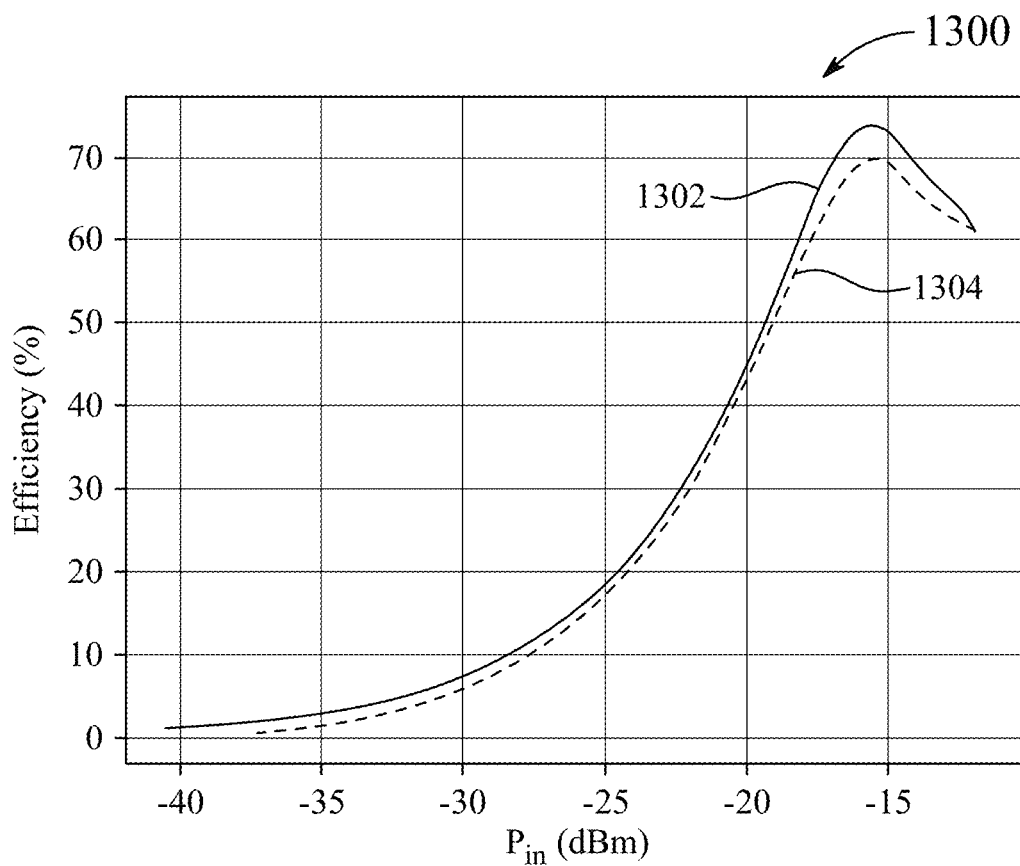
FIG. 13 is an exemplary graph illustrating a post-layout simulation result of the CMOS rectifier at $R_L$=10 k$\Omega$, according to aspects of the present disclosure.

FIG. 13 is an exemplary graph 1300 illustrating post-layout simulation result at $R_L$=10 kΩ, according to aspects of the present disclosure. Curve 1302 represents pre-layout simulation of the CMOS rectifier 200. Curve 1304 represents post-layout simulation of the CMOS rectifier 200. The post layout simulation for the circuit shown in FIG. 2 is carried out for $R_L$=10 kΩ. The simulation results shown in FIG. 13 confirm the agreement between circuit diagram and post-layout simulation with small deviation.

A figure of merit (FoM) is used to provide a comprehensive evaluation of the rectifier's performance. The FOM is given as:

$$FoM = \frac{PCE \times VCR}{N} \log_{10}\left(\frac{f}{f_0}\right) \tag{17}$$

where VCR is ratio of the DC output voltage to the peak RF differential input voltage, N is the number of stages, f is the frequency of operation, and $f_0$ is a normalization factor. In an aspect, $f_o$=5 MHz.

The performance of the CMOS rectifier 200 was compared with the recent designs and a summary of the comparison is shown in Table. 1.

TABLE 1

Comparison with relevant designs

| References | Present CMOS rectifier 200 | | Khan et al. | Kotani, et al. | Li, et al. | Khan, et al. | Basim, et al. |
|---|---|---|---|---|---|---|---|
| Technology | 0.18 μm | 0.18 μm | 0.18 μm | 0.18 μm | 0.18 μm | 0.18 μm | 0.18 μm |
| frequency | 953 MHz | 953 MHz | 13.56 MHz | 953 MHz | 915 MHz | 900 MHz | 902 MHz |
| Load | 100 kΩ | 10 kΩ | 2 kΩ | 10 kΩ | 5 kΩ | 100 kΩ | 1 MΩ |
| $P_{in}$ | −27.5 dB | −16.1 dB | 11.98 dBm | −12.5 dBm | −3.7 dBm | −19.6 dBm | 12 dBm |
| Peak PCE | 78.2% | 73.8% | 87% | 67.5% | 72.3% | 66% | 40% |
| FoM | 1.51 | 1.23 | 0.33 | 1.08 | — | — | — |
| Expr./Sim. | Sim. | Sim. | Sim. | Expr./ | Sim. | Expr./ | Sim. |
| $V_{th}$ compensation technique | Body Biasing | Body Biasing | Bootstrapping Capacitors | Differential Drive | Body Biasing | Differential Drive | Auxiliary Transistors |
| Sensitivity | −7.1 dBm | −5 dBm | — | −12.9 dBm | — | −18.2 dBm | −20 dBm |
| Area (mm²) | 0.0004 | — | 0.0768 | — | — | 0.0084 | 0.019 |

It is evident that the CMOS rectifier 200 achieves a higher efficiency than the conventional designs.

The present disclosure describes an enhanced CMOS rectifier design for RF energy harvesting. The rectifier design inserts an adaptive body biasing circuit in the conventional cross-coupled structure. This adaptive body biasing varies $V_{th}$ of the four transistors to increase the conduction current and reduce the current flowing in the reverse bias condition, resulting in a high peak PCE. The performance of the circuit was evaluated at different loading conditions. Simulation results showed that the CMOS rectifier 200 exhibited a peak efficiency of 78.2% at input power of −27.5 dBm, a load of 100 kΩ, and a 953 MHz frequency.

The first embodiment is illustrated with respect to FIGS. 1-13. The first embodiment describes a complementary metal-oxide semiconductor (CMOS) rectifier 200 for use in radio frequency (RF) energy harvesting. The CMOS rectifier 200 includes an energy harvesting antenna 202, and a first rectifier stage 204. The energy harvesting antenna 202 is configured to receive an electromagnetic radiation and generate an oscillating current, wherein the oscillating current is an RF⁺ positive current during a first half cycle and is an RF⁻ negative current during a second half cycle. The first rectifier stage 204 includes a first energy harvesting capacitor $C_1$ connected to the RF⁺ positive current, a second energy harvesting capacitor $C_2$ connected to the RF⁻ negative current, and a cross coupled CMOS circuit 206 connected to the antenna 202. The cross coupled CMOS circuit 206 includes a first output capacitor $C_{s1}$ having a first stage voltage output terminal, wherein a second terminal of $C_{s1}$ is connected to a ground; a first P-channel metal oxide semiconductor (PMOS) transistor MP1 connected at its drain to the first energy harvesting capacitor $C_1$, at its source to the first stage voltage output terminal and at its gate to the second energy harvesting capacitor $C_2$; a first N-channel metal oxide semiconductor (NMOS) transistor MN1 connected at its drain to the first harvesting capacitor $C_1$, at its source to a ground terminal and at its gate to the second energy harvesting capacitor $C_2$; a second PMOS transistor MP2 connected at its drain to the second energy harvesting capacitor $C_2$, at its source to the first stage voltage output terminal and at its gate to the first energy harvesting capacitor $C_1$; a second NMOS MN2 connected at its drain to the second harvesting capacitor $C_2$, at its source to the ground and at its gate to the first harvesting capacitor $C_1$; a first body biasing capacitor $C_{b1}$ connected between the RF⁻ negative current and a body contact of the first NMOS transistor MN1; a second body biasing capacitor $C_{b2}$ connected between the RF⁻ negative current and a body contact of the first PMOS transistor MP1; a third body biasing capacitor $C_{b3}$ connected between the RF⁺ positive current and a body contact of the second NMOS transistor MN2; and a fourth body biasing capacitor $C_{b4}$ connected between the RF⁺ positive current and a body contact of the second PMOS transistor MP2.

In an aspect, the first PMOS transistor MP1 and the second NMOS transistor MN2 are configured to operate in an ON state during the first half cycle and in an OFF state during the second half cycle; and the second PMOS transistor MP2 and the first NMOS transistor MN1 are configured to operate in an OFF state during the first half cycle and in an ON state during the second half cycle.

In an aspect, the CMOS rectifier 200 includes a load connected in parallel with the first output capacitor $C_{s1}$, wherein the cross coupled CMOS circuit 206 is configured to convert the oscillating current generated by the energy harvesting antenna 202 to a DC voltage at the first output capacitor $C_{s1}$ and provide the DC voltage to the load.

In an aspect, a threshold voltage of the first NMOS transistor MN1 is configured to increase during the first half cycle of the oscillating current and decrease during the second half cycle due to the charging and discharging respectively of the body biasing first capacitor $C_{b1}$ which biases the body contact of the first NMOS transistor MN1.

In an aspect, a threshold voltage of the first PMOS transistor MP1 is configured to decrease during the first half cycle of the oscillating current and increase during the second half cycle due to the charging and discharging respectively of the body biasing second capacitor $C_{b2}$ which biases the body contact of the first PMOS transistor MP1.

In an aspect, a threshold voltage of the second NMOS transistor MN2 is configured to decrease during the first half cycle of the oscillating current and increase during the second half cycle due to the charging and discharging respectively of the body biasing third capacitor $C_{b3}$ which biases the body contact of the second NMOS transistor MN2.

In an aspect, a threshold voltage of the second PMOS transistor MP2 is configured to increase during the first half cycle of the oscillating current and decrease during the second half cycle due to the charging and discharging respectively of the body biasing fourth capacitor $C_{b4}$ which biases the body contact of the second PMOS transistor MP2.

The second embodiment is illustrated with respect to FIGS. 1-13. The second embodiment describes a five-stage complementary metal-oxide semiconductor (CMOS) rectifier 300 for use in radio frequency (RF) energy harvesting. The CMOS rectifier 300 includes a plurality of rectifier stages including an input rectifier stage 302, three intermediate rectifier stages and an output rectifier stage 310, wherein each rectifier stage of the plurality rectifier stages is connected to an energy harvesting antenna 301 configured to receive an electromagnetic radiation and generate an oscillating current, wherein the oscillating current is an $RF^+$ positive current during a first half cycle and is an $RF^-$ negative current during a second half cycle, wherein each rectifier stage includes an input and an output; an input of the input rectifier stage is connected to a ground and an output of the input rectifier stage is connected to an input stage output capacitor $C_{s1}$, wherein input stage output capacitor $C_{s1}$ has a first stage voltage output terminal and is connected to the ground, wherein the input rectifier stage is connected to the $RF^+$ current by a first energy harvesting capacitor $C_1$ and to the $RF^-$ current by a second energy harvesting capacitor $C_2$; an input of a first intermediate rectifier stage is connected to the first stage voltage output terminal and an output of the first intermediate rectifier stage is connected to a first intermediate stage output capacitor $C_{s2}$, wherein the first intermediate output capacitor $C_{s2}$ has a first intermediate stage voltage output terminal and is connected to the first stage voltage output terminal, and wherein the first intermediate rectifier stage is connected to the $RF^+$ current by a third energy harvesting capacitor $C_3$ and to the $RF^-$ current by a fourth energy harvesting capacitor $C_4$; an input of a second intermediate rectifier stage is connected to the first intermediate stage voltage output terminal and an output of the second intermediate rectifier stage is connected to a second intermediate stage output capacitor $C_3$, wherein the second intermediate stage output capacitor $C_3$ has a second intermediate stage voltage output terminal and is connected to first intermediate stage voltage output terminal, and wherein the second intermediate rectifier stage is connected to the $RF^+$ current by a fifth energy harvesting capacitor $C_5$ and to the $RF^-$ current by a sixth energy harvesting capacitor $C_6$; an input of a third intermediate rectifier stage is connected to the second intermediate stage voltage output terminal and an output of the third intermediate rectifier stage is connected to a third intermediate stage output capacitor $C_{s4}$, wherein the third intermediate stage output capacitor $C_{s4}$ has a third intermediate stage voltage output terminal and is connected to the second intermediate stage voltage output terminal, and wherein the third intermediate rectifier stage is connected to the $RF^+$ current by a seventh energy harvesting capacitor $C_7$ and to the $RF^-$ current by an eighth energy harvesting capacitor $C_8$; an input of the output rectifier stage is connected to the third intermediate stage voltage output terminal and an output of the output rectifier stage is connected to an output stage capacitor $C_{sout}$, wherein the output stage capacitor $C_{sout}$ has an output stage voltage output terminal and is connected to the third intermediate stage voltage output terminal, and wherein the output rectifier stage is connected to the $RF^+$ current by a ninth energy harvesting capacitor $C_9$ and to the $RF^-$ current by an tenth energy harvesting capacitor $C_{10}$; a third capacitor $C_3$ connected between the $RF^-$ negative current and a body contact of the first NMOS transistor; a fourth capacitor $C_4$ connected between the $RF^-$ negative current and a body contact of the first PMOS transistor; a fifth capacitor $C_5$ connected between the $RF^+$ positive current and a body contact of the second PMOS transistor; a sixth capacitor $C_6$ connected between the $RF^+$ positive current and a body contact of the second NMOS transistor; and wherein each rectifier stage includes a cross coupled CMOS circuit connected to the antenna, wherein the cross coupled CMOS circuit includes: a first P-channel metal oxide semiconductor (PMOS) transistor connected at its drain to an $RF^+$ voltage, at its source to the output, at its gate to an RF-voltage, and at its body contact to a body biasing capacitor connected to the $RF^-$ current; a first N-channel metal oxide semiconductor (NMOS) transistor connected at its drain to an $RF^+$ voltage, at its source to the input, at its gate to an $RF^-$ voltage, and at its body contact to a body biasing capacitor connected to the $RF^-$ current; a second PMOS transistor connected at its drain to the $RF^-$ voltage, at its source to the output, at its gate to an $RF^+$ voltage and at its body contact to a body biasing capacitor connected to the $RF^+$ current; and a second NMOS transistor connected at its drain to the $RF^-$ voltage, at its source to the input, at its gate to the $RF^+$ voltage, and at its body contact to a body biasing capacitor connected to the $RF^+$ current.

In an aspect, the first PMOS transistor and the second NMOS transistor are configured to operate in an ON state during the first half cycle and in an OFF state during the second half cycle; and the second PMOS transistor and the first NMOS transistor are configured to operate in an OFF state during the first half cycle and in an ON state during the second half cycle.

In an aspect, the five-stage CMOS rectifier 300 includes a load connected in parallel with the first stage output capacitor $C_{s1}$, the first intermediate output capacitor $C_{s2}$, the second intermediate stage output capacitor $C_{s3}$, the third intermediate stage output capacitor $C_{s4}$ and output stage capacitor $C_{sout}$, wherein the five-stage CMOS rectifier 300 is configured to convert the oscillating current generated by the energy harvesting antenna 301 to a DC voltage and provide the DC voltage to the load.

In an aspect, a threshold voltage of each first NMOS transistor is configured to increase during the first half cycle of the oscillating current and decrease during the second half cycle due to the charging and discharging charging respectively of the body biasing capacitor which biases the body contact of each first NMOS transistor.

In an aspect, a threshold voltage of each first PMOS transistor is configured to decrease during the first half cycle of the oscillating current and increase during the second half cycle due to the charging and discharging respectively of the body biasing capacitor which biases the body contact of the first PMOS transistor.

In an aspect, a threshold voltage of each second PMOS transistor is configured to increase during the first half cycle of the oscillating current and decrease during the second half cycle due to the charging and discharging respectively of the body biasing capacitor which biases the body contact of each second PMOS transistor.

In an aspect, a threshold voltage of each second NMOS transistor is configured to decrease during the first half cycle of the oscillating current and increase during the second half cycle due to the charging and discharging respectively of the body biasing capacitor which biases the body contact of each second NMOS transistor.

The third embodiment is illustrated with respect to FIGS. 1-13. The third embodiment describes a method for harvesting radio frequency (RF) energy. The method includes receiving, by an energy harvesting antenna 202, an electromagnetic radiation. The method includes generating, by the energy harvesting antenna 202, an oscillating current, wherein the oscillating current is an $RF^+$ positive current during a first half cycle and is an $RF^-$ negative current during a second half cycle. The method includes connecting a first energy harvesting capacitor $C_1$ to the $RF^+$ positive current. The method further includes connecting a second energy harvesting capacitor $C_2$ to the $RF^-$ negative current. The method further includes connecting a cross coupled CMOS circuit 206 to the first energy harvesting capacitor $C_1$ and the second energy harvesting capacitor $C_2$, wherein connecting the cross coupled CMOS circuit includes: connecting the first stage voltage output terminal to a first output capacitor $C_{s1}$ having and connecting a second terminal of $C_{s1}$ to a ground; connecting a first P-channel metal oxide semiconductor (PMOS) transistor MP1 at its drain to the first energy harvesting capacitor $C_1$, at its source to the first stage voltage output terminal and at its gate to the second energy harvesting capacitor $C_2$; connecting a first N-channel metal oxide semiconductor (NMOS) transistor MN1 at its drain to the first energy harvesting capacitor $C_1$, at its source to a ground terminal and at its gate to the second energy harvesting capacitor $C_2$; connecting a second PMOS transistor MP2 \at its drain to the second energy harvesting capacitor $C_2$, at its source to the first stage voltage output terminal and at its gate to the first energy harvesting capacitor $C_1$; connecting a second NMOS transistor MN2 connected at its drain to the second energy harvesting capacitor $C_2$, at its source to the ground and at its gate to the first energy harvesting capacitor $C_1$; connecting a first body biasing capacitor $C_{b1}$ between the $RF^-$ negative current and a body contact of the first NMOS transistor MN1; connecting a second body biasing capacitor $C_{b2}$ between the $RF^-$ negative current and a body contact of the first PMOS transistor MP1; connecting a third body biasing capacitor $C_{b3}$ between the $RF^+$ positive current and a body contact of the second NMOS transistor MN2; and connecting a fourth body biasing capacitor $C_{b4}$ between the $RF^+$ positive current and a body contact of the second PMOS transistor MP2.

In an aspect, the method further includes configuring the first PMOS transistor MP1 and the second NMOS transistor MN2 for operating in an ON state during the first half cycle and for operating in an OFF state during the second half cycle.

In an aspect, the method further includes configuring the second PMOS transistor MP2 and the first NMOS transistor MN1 for operating in an OFF state during the first half cycle and operating in an ON state during the second half cycle.

In an aspect, the method further includes connecting a load in parallel with the first output capacitor $C_{s1}$, wherein the cross coupled CMOS circuit is configured for converting the oscillating current generated by the energy harvesting antenna to a DC voltage at the first output capacitor and providing the DC voltage to the load.

In an aspect, the method further includes configuring a threshold voltage of the first NMOS transistor MN1 for increasing during the first half cycle of the oscillating current and for decreasing during the second half cycle due to the charging and discharging respectively of the body biasing first capacitor $C_{b1}$ which biases the body contact of the first NMOS transistor MN1; and configuring a threshold voltage of the first PMOS transistor MP1 for decreasing during the first half cycle of the oscillating current and for increasing during the second half cycle due to the charging and discharging respectively of the body biasing second capacitor $C_{b2}$ which biases the body contact of the first PMOS transistor MP1.

In an aspect, the method further includes configuring a threshold voltage of the second PMOS transistor MP2 for increasing during the first half cycle of the oscillating current and for decreasing during the second half cycle due to the charging and discharging respectively body biasing third capacitor $C_{b3}$ which biases the body contact of the second PMOS transistor MP2; and configuring a threshold voltage of the second NMOS transistor MN2 for decreasing during the first half cycle of the oscillating current and for increasing during the second half cycle due to the charging and discharging respectively of the body biasing fourth capacitor $C_{b4}$ which biases the body contact of the second NMOS transistor MN2.

In an aspect, the method further includes connecting an input of a second cross coupled CMOS circuit to a third linking capacitor $C_{13}$ and a fourth linking capacitor $C_{14}$, wherein the second cross coupled CMOS circuit includes: a second output capacitor $C_{s2}$ having a second stage voltage output terminal, wherein a second terminal of $C_{s2}$ is connected to the ground; a first PMOS transistor MP3 connected at its drain to the first capacitor $C_1$, at its source to the second stage voltage output terminal and at its gate to the second capacitor $C_2$; a first NMOS transistor MN3 connected at its drain to the first capacitor $C_1$, at its source to the input and at its gate to the second capacitor $C_2$; a second PMOS transistor MP4 connected at its drain to the second capacitor $C_2$, at its source to the second stage voltage output terminal and at its gate to the first capacitor $C_1$; a second NMOS transistor MN4 connected at its drain to the second capacitor $C_2$, at its source to the input and at its gate to the first capacitor $C_1$; a seventh capacitor $C_7$ connected between the $RF^-$ negative current and a body contact of the first NMOS transistor MN3; an eight capacitor $C_8$ connected between the $RF^-$ negative current and a body contact of the first PMOS transistor MP3; a fifth capacitor $C_5$ connected between the $RF^+$ positive current and a body contact of the second PMOS transistor MP2; and a sixth capacitor $C_6$ connected between the $RF^+$ positive current and a body contact of the second NMOS transistor MN2.

The above-described hardware description is a non-limiting example of corresponding structure for performing the functionality described herein.

Numerous modifications and variations of the present disclosure are possible in light of the above teachings. It is therefore to be understood that within the scope of the appended claims, the disclosure may be practiced otherwise than as specifically described herein.

The invention claimed is:

1. A five-stage complementary metal-oxide semiconductor (CMOS) rectifier with energy harvesting antenna, comprising:

a plurality of rectifier stages including an input rectifier stage, three intermediate rectifier stages and an output rectifier stage, wherein each rectifier stage of the plurality rectifier stages is connected to an energy harvesting antenna selected from the group consisting of a copper wire, a copper wire coil, a silver wire coil, a ferrite coil and a combination thereof and configured to receive an electromagnetic radiation and generate an oscillating current, wherein the oscillating current is an $RF^+$ positive current during a first half cycle and is an $RF^-$ negative current during a second half cycle, wherein each rectifier stage includes an input and an output;

an input of the input rectifier stage is connected to a ground and an output of the input rectifier stage is connected to an input stage output capacitor $C_{s1}$, wherein input stage output capacitor $C_{s1}$ has a first stage voltage output terminal and is connected to the ground, wherein the input rectifier stage is connected to the $RF^+$ current by a first energy harvesting capacitor $C_1$ and to the $RF^-$ current by a second energy harvesting capacitor $C_2$;

an input of a first intermediate rectifier stage is connected to the first stage voltage output terminal and an output of the first intermediate rectifier stage is connected to a first intermediate stage output capacitor $C_{s2}$, wherein the first intermediate output capacitor $C_{s2}$ has a first intermediate stage voltage output terminal and is connected to the first stage voltage output terminal, and wherein the first intermediate rectifier stage is connected to the $RF^+$ current by a third energy harvesting capacitor $C_3$ and to the $RF^-$ current by a fourth energy harvesting capacitor $C_4$;

an input of a second intermediate rectifier stage is connected to the first intermediate stage voltage output terminal and an output of the second intermediate rectifier stage is connected to a second intermediate stage output capacitor $C_3$, wherein the second intermediate stage output capacitor $C_3$ has a second intermediate stage voltage output terminal and is connected to first intermediate stage voltage output terminal, and wherein the second intermediate rectifier stage is connected to the $RF^+$ current by a fifth energy harvesting capacitor $C_5$ and to the $RF^-$ current by a sixth energy harvesting capacitor $C_6$;

an input of a third intermediate rectifier stage is connected to the second intermediate stage voltage output terminal and an output of the third intermediate rectifier stage is connected to a third intermediate stage output capacitor $C_{s4}$, wherein the third intermediate stage output capacitor $C_{s4}$ has a third intermediate stage voltage output terminal and is connected to the second intermediate stage voltage output terminal, and wherein the third intermediate rectifier stage is connected to the $RF^+$ current by a seventh energy harvesting capacitor $C_7$ and to the $RF^-$ current by an eighth energy harvesting capacitor $C_8$;

an input of the output rectifier stage is connected to the third intermediate stage voltage output terminal and an output of the output rectifier stage is connected to an output stage capacitor $C_{sout}$, wherein the output stage capacitor $C_{sout}$ has an output stage voltage output terminal and is connected to the third intermediate stage voltage output terminal, and wherein the output rectifier stage is connected to the $RF^+$ current by a ninth energy harvesting capacitor $C_9$ and to the $RF^-$ current by a tenth energy harvesting capacitor $C_{10}$;

a third capacitor $C_3$ connected between the $RF^-$ negative current and a body contact of the first NMOS transistor;

a fourth capacitor $C_4$ connected between the $RF^-$ negative current and a body contact of the first PMOS transistor;

a fifth capacitor $C_5$ connected between the $RF^+$ positive current and a body contact of the second PMOS transistor;

a sixth capacitor $C_6$ connected between the $RF^+$ positive current and a body contact of the second NMOS transistor; and wherein each rectifier stage includes a cross coupled CMOS circuit connected to the antenna, wherein the cross coupled CMOS circuit includes:

a first P-channel metal oxide semiconductor (PMOS) transistor connected at its drain to an $RF^+$ voltage, at its source to the output, at its gate to an RF-voltage, and at its body contact to a body biasing capacitor connected to the $RF^-$ current;

a first N-channel metal oxide semiconductor (NMOS) transistor connected at its drain to an $RF^+$ voltage, at its source to the input, at its gate to an $RF^-$ voltage, and at its body contact to a body biasing capacitor connected to the $RF^-$ current;

a second PMOS transistor connected at its drain to the $RF^-$ voltage, at its source to the output, at its gate to an $RF^+$ voltage and at its body contact to a body biasing capacitor connected to the $RF^+$ current; and a second NMOS transistor connected at its drain to the $RF^-$ voltage, at its source to the input, at its gate to the $RF^+$ voltage, and at its body contact to a body biasing capacitor connected to the $RF^+$ current.

2. The five-stage CMOS rectifier of claim 1, wherein:
the first PMOS transistor and the second NMOS transistor are configured to operate in an ON state during the first half cycle and in an OFF state during the second half cycle; and
the second PMOS transistor and the first NMOS transistor are configured to operate in an OFF state during the first half cycle and in an ON state during the second half cycle.

3. The five-stage CMOS rectifier of claim 1, further comprising:
a load connected in parallel with the first stage output capacitor $C_{s1}$, the first intermediate output capacitor $C_{s2}$, the second intermediate stage output capacitor $C_{s3}$, the third intermediate stage output capacitor $C_{s4}$ and output stage capacitor $C_{sout}$, wherein the five-stage CMOS rectifier is configured to convert the oscillating current generated by the energy harvesting antenna to a DC voltage and provide the DC voltage to the load.

4. The five-stage CMOS rectifier of claim 1, wherein a threshold voltage of each first NMOS transistor is configured to increase during the first half cycle of the oscillating current and decrease during the second half cycle due to the charging and discharging charging respectively of the body biasing capacitor which biases the body contact of each first NMOS transistor.

5. The five-stage CMOS rectifier of claim 1, wherein a threshold voltage of each first PMOS transistor is configured to decrease during the first half cycle of the oscillating current and increase during the second half cycle due to the charging and discharging respectively of the body biasing capacitor which biases the body contact of the first PMOS transistor.

6. The five-stage CMOS rectifier of claim 1, wherein a threshold voltage of each second PMOS transistor is configured to increase during the first half cycle of the oscillating current and decrease during the second half cycle due to the charging and discharging respectively of the body biasing capacitor which biases the body contact of each second PMOS transistor.

7. The five-stage CMOS rectifier of claim 1, wherein a threshold voltage of each second NMOS transistor is configured to decrease during the first half cycle of the oscillating current and increase during the second half cycle due to the charging and discharging respectively of the body biasing capacitor which biases the body contact of each second NMOS transistor.

\* \* \* \* \*